(12) United States Patent
Yamazaki et al.

(10) Patent No.: US 11,157,750 B2
(45) Date of Patent: Oct. 26, 2021

(54) CAPTURED IMAGE CHECK SYSTEM AND CAPTURED IMAGE CHECK METHOD

(71) Applicant: Toshiba Infrastructure Systems & Solutions Corporation, Kanagawa (JP)

(72) Inventors: Takahiko Yamazaki, Chiba (JP); Nobuyuki Kumakura, Kanagawa (JP); Masaki Shiratsuki, Kanagawa (JP); Yoko Yonekawa, Tokyo (JP); Akira Wada, Tokyo (JP)

(73) Assignee: Toshiba Infrastructure Systems & Solutions Corporation, Kanagawa (JP)

( * ) Notice: Subject to any disclaimer, the term of this patent is extended or adjusted under 35 U.S.C. 154(b) by 102 days.

(21) Appl. No.: 16/266,588

(22) Filed: Feb. 4, 2019

(65) Prior Publication Data

US 2019/0279001 A1    Sep. 12, 2019

(30) Foreign Application Priority Data

Mar. 6, 2018   (JP) .............................. JP2018-040201

(51) Int. Cl.
　　*G06K 9/00*　　(2006.01)
　　*G06K 9/46*　　(2006.01)
　　*G06K 9/44*　　(2006.01)

(52) U.S. Cl.
　　CPC ........... *G06K 9/00791* (2013.01); *G06K 9/44* (2013.01); *G06K 9/46* (2013.01)

(58) Field of Classification Search
　　CPC .................... E01C 23/01; G01N 21/88; G01N 2021/8858; G01N 2021/8861; G01N 21/8851; G01N 21/95; G01N 21/9515; G06K 9/00791; G06K 9/00798; G06K 9/44; G06K 9/46; G06K 9/4661; G06T 2207/30256; G06T 2207/20021; G06T 2207/20032; G06T 2207/30132;
(Continued)

(56) References Cited

U.S. PATENT DOCUMENTS 9,129,355 B1 *   9/2015  Harvey ................. G06T 7/0008
9,710,899 B2 *   7/2017  Seki ...................... G06T 3/0018
(Continued)

FOREIGN PATENT DOCUMENTS

JP　　　　08-184422 A　　　7/1996
JP　　　2004-274431 A　　　9/2004
(Continued)

*Primary Examiner* — Ian L Lemieux
(74) *Attorney, Agent, or Firm* — Baker Botts L.L.P.

(57) ABSTRACT

According to an embodiment, a captured image check system includes a camera, an image data input unit, a camera view angle judge processor, a road surface state analysis judge processor, and an output unit. The camera photographs a road surface. The image data input unit inputs image data to be used for analyzing a state of the road surface. The camera view angle judge processor performs a judge process of determining whether or not an angle of view of the camera satisfies a first condition for analyzing the state of the road surface on the basis of the image data. The road surface state analysis judge processor performs a judge process of determining whether or not a second condition for analyzing the state of the road surface is satisfied on the basis of image data of the road surface. The output unit outputs results of the judge processes.

11 Claims, 17 Drawing Sheets

(58) Field of Classification Search
CPC ......... G06T 2207/30242; G06T 7/0004; G06T 7/70; G06T 5/008; G06T 5/20; G01B 11/30; G06Q 10/06311; G06Q 10/20; G06Q 10/08; G06Q 50/08; G08G 1/096716

See application file for complete search history.

(56) References Cited

U.S. PATENT DOCUMENTS

| | | | |
|---|---|---|---|
| 10,389,984 B2* | 8/2019 | Yonekawa | G08G 1/096716 |
| 10,467,483 B2* | 11/2019 | Kamada | B60R 1/00 |
| 2004/0252864 A1* | 12/2004 | Chang | G06K 9/00805 |
| | | | 382/104 |
| 2009/0262145 A1* | 10/2009 | Akita | G01C 21/3667 |
| | | | 345/679 |
| 2010/0097457 A1* | 4/2010 | Zhang | G06K 9/00798 |
| | | | 348/119 |
| 2011/0205365 A1* | 8/2011 | Kurosu | G01C 21/32 |
| | | | 348/148 |
| 2013/0169794 A1* | 7/2013 | Shimomura | B60R 1/00 |
| | | | 348/128 |
| 2016/0055392 A1 | 2/2016 | Nakano | |
| 2016/0125612 A1* | 5/2016 | Seki | G06K 9/00798 |
| | | | 382/106 |
| 2016/0133008 A1* | 5/2016 | Kuratate | G06T 7/001 |
| | | | 382/141 |
| 2016/0342848 A1* | 11/2016 | Seki | G06K 9/00791 |
| 2018/0082135 A1* | 3/2018 | Crawford | G06K 9/00791 |
| 2018/0195973 A1 | 7/2018 | Yonekawa et al. | |
| 2018/0276832 A1* | 9/2018 | Aikin | H04N 5/2256 |
| 2018/0300867 A1* | 10/2018 | Nonaka | G01N 21/8851 |
| 2019/0092239 A1* | 3/2019 | Yamada | H04N 5/243 |
| 2019/0163994 A1* | 5/2019 | Yonekawa | G06T 5/20 |
| 2020/0074413 A1* | 3/2020 | Yonekawa | G06Q 10/20 |
| 2020/0162626 A1* | 5/2020 | Yonaha | G01B 11/30 |
| 2020/0175352 A1* | 6/2020 | Cha | G06N 3/08 |

FOREIGN PATENT DOCUMENTS

| | | |
|---|---|---|
| JP | 2005-115687 A | 4/2005 |
| JP | 2011-179874 A | 9/2011 |
| JP | 2015-090345 A | 5/2015 |
| JP | 2016-045508 A | 4/2016 |
| JP | 2018-021375 A | 2/2018 |
| WO | 2017/014288 A1 | 1/2017 |

\* cited by examiner

INPUT INFORMATION
- IMAGE DATA OF ROAD SURFACE
- SECTION ATTRIBUTE INFORMATION OF ROAD SURFACE
- CAMERA POSITION INFORMATION
- CAMERA DIRECTION
- CAMERA HEIGHT
- CAMERA MODEL INFORMATION AND LIKE
- ANALYSIS OPERATOR INFORMATION

INPUT → CRACK ANALYSIS DEVICE 1 → OUTPUT

OUTPUT INFORMATION
- CRACK DETECTION IMAGE (FRAME IMAGE/ ORTHO-IMAGE)
- CRACK RATE
- VERIFICATION DATA
- REPORT TABLE (VERIFICATION DATA)
- SCREEN DISPLAY (GEOGRAPHIC INFORMATION SYSTEM)

(B)

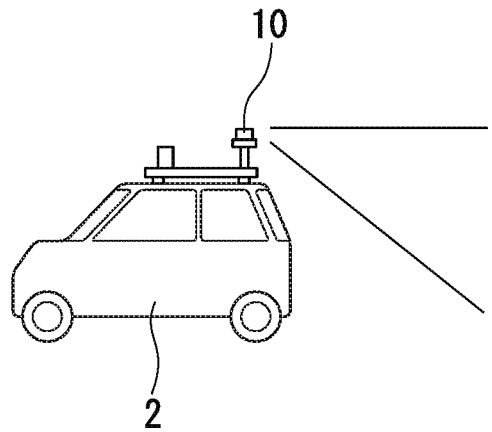

(C)

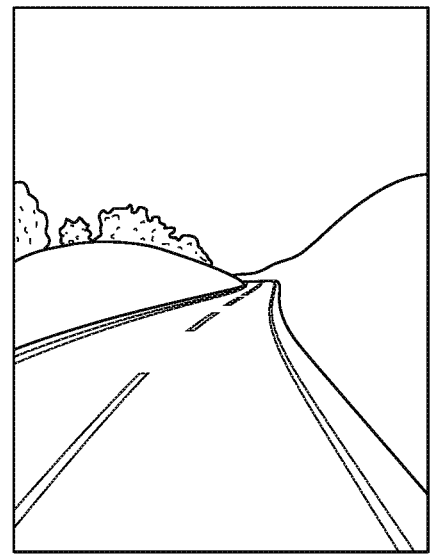

CAPTURED IMAGE CHECK SYSTEM AND CAPTURED IMAGE CHECK METHOD

CROSS-REFERENCE TO RELATED APPLICATION

This application is based upon and claims the benefit of priority from Japanese Patent Application No. 2018/040201 filed on Mar. 6, 2018, and the entire contents of which are incorporated herein by reference.

FIELD

Embodiments described herein relate generally to a captured image check system and a captured image check method.

BACKGROUND

Conventionally, the inspection of road pavement has been performed to investigate characteristics of a road surface by using a dedicated vehicle. However, in the conventional investigation, it is necessary to use the dedicated vehicle and cost is required. Therefore, inspection technology based on a simple technique using commercially available video cameras or smartphones is being studied. Anyone can easily implement inspection techniques using commercially available video cameras. However, a captured image may be affected by environmental conditions such as weather and illuminance, a camera angle during photographing, and the like, which may have an influence on an inspection result. Thus, there is a need for technology for allowing a state in which a road surface is photographed to be easily checked.

BRIEF DESCRIPTION OF THE DRAWINGS

FIG. 1 is a diagram illustrating a schematic configuration of a crack analysis device of road surface.

DETAILED DESCRIPTION

Figure 2:
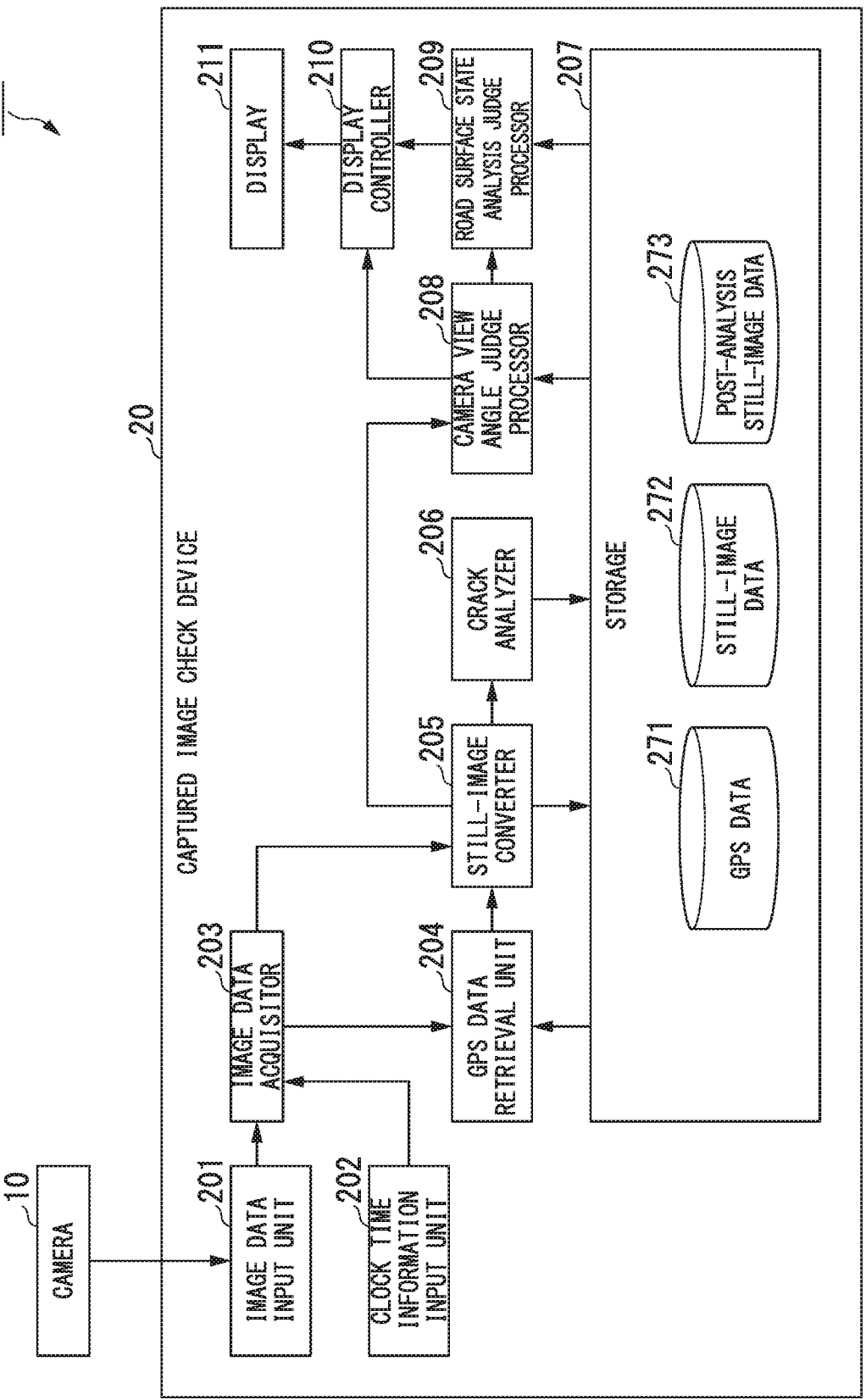
FIG. 2 is a diagram illustrating a system configuration of a captured image check system according to a first embodiment.

The present invention provides a captured image check system and a captured image check method capable of easily checking a state in which a road surface is photographed.

According to one embodiment, a captured image check system includes a camera, an image data input unit, a camera view angle judge processor, a road surface state analysis judge processor, and an output unit. The camera photographs a road surface. The image data input unit inputs image data to be used for analyzing a state of the road surface photographed by the camera. The camera view angle judge processor performs a judge process of determining whether or not an angle of view of the camera satisfies a first condition for analyzing the state of the road surface on the basis of the image data input to the image data input unit. The road surface state analysis judge processor performs a judge process of determining whether or not a second condition for analyzing the state of the road surface is satisfied on the basis of image data of the road surface input to the image data input unit. The output unit outputs a result of the judge process of the camera view angle judge processor and a result of the judge process of the road surface state analysis judge processor.

Hereinafter, a captured image check system and a captured image check method according to embodiments will be described with reference to the drawings.

First Embodiment

First, the crack analysis device of road surface will be schematically described with reference to FIG. 1.

FIG. 1(A) schematically illustrates input information input to a crack analysis device of road surface 1 and output information output from the crack analysis device of road surface 1. The crack analysis device of road surface 1 is a device configured to analyze damage to a road surface (e.g., a crack of road surface) from a captured image of a road surface while performing a check using a captured image check device to be described below.

In FIG. 1(A), the input information includes, for example, data of a captured image obtained by photographing a road surface with the camera 10, section attribute information of a route for photographing the road surface, position information (position data) of a camera capturing the captured image, a direction of the camera 10, a height of the camera 10 from the road surface, information of a camera model and the like, information of an analysis operator who performs an analysis operation, and the like. On the basis of such input information, the crack analysis system performs analysis and outputs a crack detection image in which an image representing a shape of a crack of road surface is superimposed on a captured image, a crack ratio indicating an area ratio of a crack on a road surface calculated on the basis of the captured image, verification data for verifying that a road surface for which the crack ratio has been calculated is a correct inspection target, a report table indicating an inspection result, a screen display, and the like.

FIG. 1(B) is a view illustrating an example of an arrangement of the camera.

In FIG. 1(B), the camera 10 is mounted on a roof of a vehicle 2. The camera 10 is arranged to face a rear side in a traveling direction of the vehicle 2. Also, the camera may face a front side.

Also, the camera 10 is fixed by adjusting a direction of the camera such as a depression angle to the road surface, a height from the road surface, and an angle of deviation of a photographing direction (a yawing angle of a horizontal direction) in the traveling direction of the vehicle 2 according to a range of the road surface to be photographed.

FIG. 1(C) is a diagram illustrating an example of a road surface video captured by the camera. In FIG. 1(C), a road surface video captured by the camera 10 is captured by adjusting a direction of the camera to photograph a road surface of a single-side traffic lane of a road on which the vehicle is traveling. That is, in FIG. 1(C), when the vehicle travels at a center of a single-side traffic lane, the direction of the camera is adjusted so that a center line is photographed at approximately a left end illustrated therein. Also, the direction of the camera is adjusted so that a traffic lane side line on a left side of the traveling direction of the vehicle is photographed at a right end illustrated in FIG. 1(C).

In this manner, it is important to adjust the direction of the camera to a photographing range in order to perform necessary and sufficient road surface analysis. Thus, it is necessary to photograph the road surface while checking whether it is possible to capture an image necessary and sufficient for road surface analysis when a road surface video for crack analysis is captured.

FIG. 2 is a diagram illustrating a system configuration of the captured image check system 100 according to the first embodiment.

The captured image check system 100 includes the camera 10 and a captured image check device 20.

The camera 10 photographs a road surface that is a road surface state analysis target. More specifically, the camera 10 is fixedly installed at a predetermined depression angle on the roof of the vehicle 2 in a state in which the road surface that is the road surface state analysis target can be photographed. The camera 10 is, for example, a commercially available camera. Image data obtained through photographing performed by the camera 10 may be image data of a still image or image data of a moving image. In the present embodiment, a case where the camera 10 photographs a road surface in a moving image will be described as an example.

The captured image check device 20 is a device configured to input image data obtained through photographing performed by the camera 10 and performs a pre judge process of image data used for analyzing the road surface state on the basis of the input image data. A connection between the camera 10 and the captured image check device 20 may be either a wired connection or a wireless connection. The pre judge process is a process of determining whether the image data is image data available for analyzing the road surface state, and is, for example, a judge process of making a judge of whether or not image data is data obtained through photographing at a correct angle of view, i.e., a judge of whether or not an angle of view of the camera 10 is a correct angle of view, or a judge process of making a judge of whether or not the road surface state can be analyzed using the image data obtained through photographing by the camera 10. The captured image check device 20 is provided within the vehicle 2 that travels on a road on which a road surface is photographed.

The captured image check device 20 includes a central processing unit (CPU), a memory, an auxiliary storage device, and the like connected by a bus, and executes a captured image check program. By executing the captured image check program, the captured image check device 20 functions as a device including an image data input unit 201, a clock time information input unit 202, a image data acquisitor 203, a Global Positioning System (GPS) data retrieval unit 204, a still-image converter 205, a crack analyzer 206, a storage 207, a camera view angle judge processor 208, a road surface state analysis judge processor 209, a display controller 210, and a display 211 serving as an output unit. Also, all or some of functions of the captured image check device 20 may be implemented using hardware such as application specific integrated circuit (ASIC), a programmable logic device (PLD), or a field programmable gate array (FPGA). The captured image check program may be recorded on a computer-readable recording medium. Also, the computer-readable recording medium is a storage device such as a flexible disk, a magneto-optical disc, a read only memory (ROM), a portable medium such as a compact disc (CD)-ROM, or a hard disk embedded in a computer system. The captured image check program may be transmitted and received via an electrical communication circuit.

The image data input unit 201 is a functional unit configured to input image data of a road surface of a moving image captured by the camera 10. That is, the image data input unit 201 is a functional unit configured to input image data that is obtained through photographing performed by the camera 10 and used for analyzing the state of the road surface.

The clock time information input unit 202 is a functional unit configured to receive inputs of a start clock time and an acquisition time for the moving image input by the image data input unit 201. The start clock time represents a clock time of a start target of the pre judge process in a moving image. That is, image data from a clock time specified by the start clock time in the moving image serves as a target of the pre judge process. The acquisition time represents a length of time for acquiring the image data from the moving image on the basis of the start clock time. For example, if the acquisition time is 10 minutes, this means that image data is acquired until 10 minutes have elapsed from the start clock time.

The image data acquisitor 203 is a functional unit configured to acquire image data for the acquisition time based on the start clock time from the moving image on the basis of the image data of the moving image input to the image data input unit 201 and the start clock time and the acquisition time input to the clock time information input unit 202. Hereinafter, the image data acquired by the image data acquisitor 203 will be described as processing target image data.

The GPS data retrieval unit 204 is a functional unit configured to retrieve GPS data with reference to clock time information of the processing target image data acquired by the image data acquisitor 203. The GPS data is a file in which position information of the vehicle 2 equipped with the camera 10 is associated with clock time information. The GPS data is created by a device in which position measurement based on the GPS is possible during photographing by the camera 10 and stored in the storage 207. When the GPS data can be retrieved, the GPS data retrieval unit 204 outputs the processing target image data, the clock time information, and the position information acquired by the image data acquisitor 203 to the still-image converter 205.

The still-image converter 205 is a functional unit configured to convert the processing target image data output from the GPS data retrieval unit 204 or the processing target image data output from the image data acquisitor 203 into image data of a still image. The still-image converter 205 associates the image data of the still image (hereinafter referred to as "still-image data") with clock time information and position information to store them in the storage 207. Also, if the still-image converter 205 directly acquires the processing target image data from the image data acquisitor 203, the still-image converter 205 associates the still-image data with the clock time information to store them in the storage 207. Furthermore, the still-image converter 205 also outputs the still-image data to the crack analyzer 206 and the camera view angle judge processor 208.

The crack analyzer 206 is a functional unit configured to detect cracks on the road surface from the still-image data by using the still-image data after conversion by the still-image converter 205. In the crack detection, existing technology (e.g., technology described in Japanese Patent Application No. 2016-557662) may be used. Also, the crack analyzer 206 generates post-analysis still-image data by superimposing detected cracks on the still-image data.

The storage 207 stores GPS data 271, still-image data 272, and post-analysis still-image data 273. The storage 207 is configured using a storage device such as a magnetic hard disk device or a semiconductor storage device.

The camera view angle judge processor 208 is a functional unit configured to perform a judge process of determining whether or not an angle of view of the camera 10 satisfies a first condition for analyzing the state of the road surface on the basis of still-image data after conversion by the still-image converter 205. The first condition can be sub-divided into, for example, the following conditions 1 to 4.

Condition 1: the camera 10 is facing a rear side (a direction opposite to a traveling direction of the vehicle 2) or facing a front side Condition 2: a traffic lane of the road surface that is the road surface state analysis target appears near a center of still-image data Condition 3: a horizon appears in a predetermined range on the still-image data Condition 4: a body of the vehicle 2 equipped with the camera 10 photographing the road surface appears in the still-image data Here, when the first condition is satisfied, any one or all of conditions 1 to 4 are satisfied. If the first condition is that any one of conditions 1 to 4 is satisfied, a condition to be required to be satisfied may be preset. Hereinafter, the judge process to be performed by the camera view angle judge processor 208 will be described as a camera view angle judge process.

The road surface state analysis judge processor 209 is a functional unit having a function of automatically determining whether a crack has been detected and configured to perform a judge process of determining whether or not the second condition for analyzing the state of the road surface is satisfied on the basis of still-image data after conversion by the still-image converter 205. The second condition is that a crack of the road surface is detected from the still-image data. Hereinafter, the judge process to be performed by the road surface state analysis judge processor 209 will be described as a crack detection judge process.

The display controller 210 is a functional unit configured to control the display of the display 211. For example, the display controller 210 causes the display 211 to display information necessary for the judge process during the judge process of the camera view angle judge processor 208 and the judge process of the road surface state analysis judge processor 209. Also, for example, the display controller 210 causes the display 211 to display a result of the judge process of the camera view angle judge processor 208 and a result of the judge process of the road surface state analysis judge processor 209.

The display 211 is an image display device such as a liquid crystal display or an organic electro luminescence (EL) display. The display 211 displays information necessary for the judge processes and judge results. The display 211 may be an interface for connecting the image display device to the captured image check device 20. In this case, the display 211 generates video signals for displaying the information necessary for the judge processes and the judge results and outputs the video signals to the image display device connected to the display 211.

Figure 3:
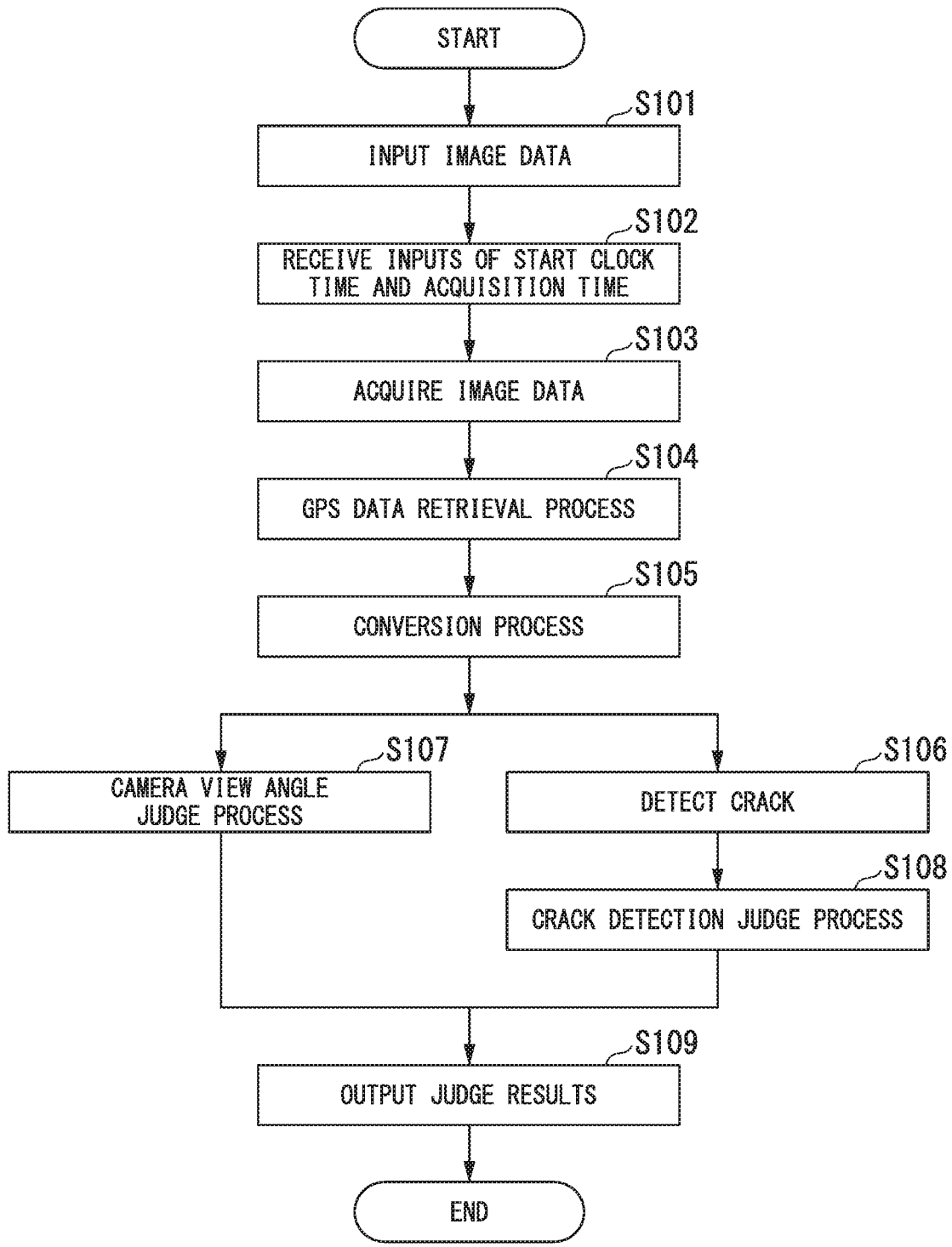
FIG. 3 is a flowchart illustrating a flow of a process of a captured image check device according to the first embodiment.

FIG. 3 is a flowchart illustrating a flow of a process of the captured image check device 20 according to the first embodiment.

When image data of a moving image captured by the camera 10 is input from the image data input unit 201 in step S101, the input image data of the moving image is output to the image data acquisitor 203.

In step S102, the clock time information input unit 202 receives inputs of a start clock time and an acquisition time for the moving image. For example, the clock time information input unit 202 receives the inputs of the start clock time and the acquisition time from an external device such as a keyboard. The clock time information input unit 202 outputs information of the input start clock time and acquisition time to the image data acquisitor 203.

In step S103, the image data acquisitor 203 acquires image data for the acquisition time based on the start clock time from the moving image on the basis of the image data of the moving image output from the image data input unit 201 and the information of the start clock time and the acquisition time output from the clock time information input unit 202. Specifically, if the start clock time is 00:00:00 and the acquisition time is 10 minutes, the image data acquisitor 203 acquires image data as processing target image data until 10 minutes have elapsed from 00:00:00 of image data of the moving image. The image data acquisitor 203 outputs the acquired processing target image data to the GPS data retrieval unit 204.

In step S104, the GPS data retrieval unit 204 retrieves the GPS data 271 corresponding to a clock time indicated by the clock time information of the processing target image data from the storage 207 with reference to clock time information of the processing target image data acquired by the image data acquisitor 203. If the GPS data can be retrieved, the GPS data retrieval unit 204 outputs the processing target image data, the clock time information, and the position information acquired by the image data acquisitor 203 to the still-image converter 205. On the other hand, if the GPS data retrieval unit 204 cannot retrieve the GPS data, the GPS data retrieval unit 204 outputs an error and causes the process of FIG. 3 to be terminated.

In step S105, the still-image converter 205 converts the processing target image data output from the GPS data retrieval unit 204 into still-image data. The still-image converter 205 associates the still-image data with the clock time information and the position information to store them as the still-image data 272 in the storage 207. Also, the still-image converter 205 outputs still-image data after conversion to the crack analyzer 206 and the camera view angle judge processor 208.

Next, the camera view angle judge process of step S107 is performed. When conversion for the still-image data after conversion by the still-image converter 205 is completed, the display controller 210 causes the display 211 to display a screen illustrated in FIG. 4.

Figure 4:
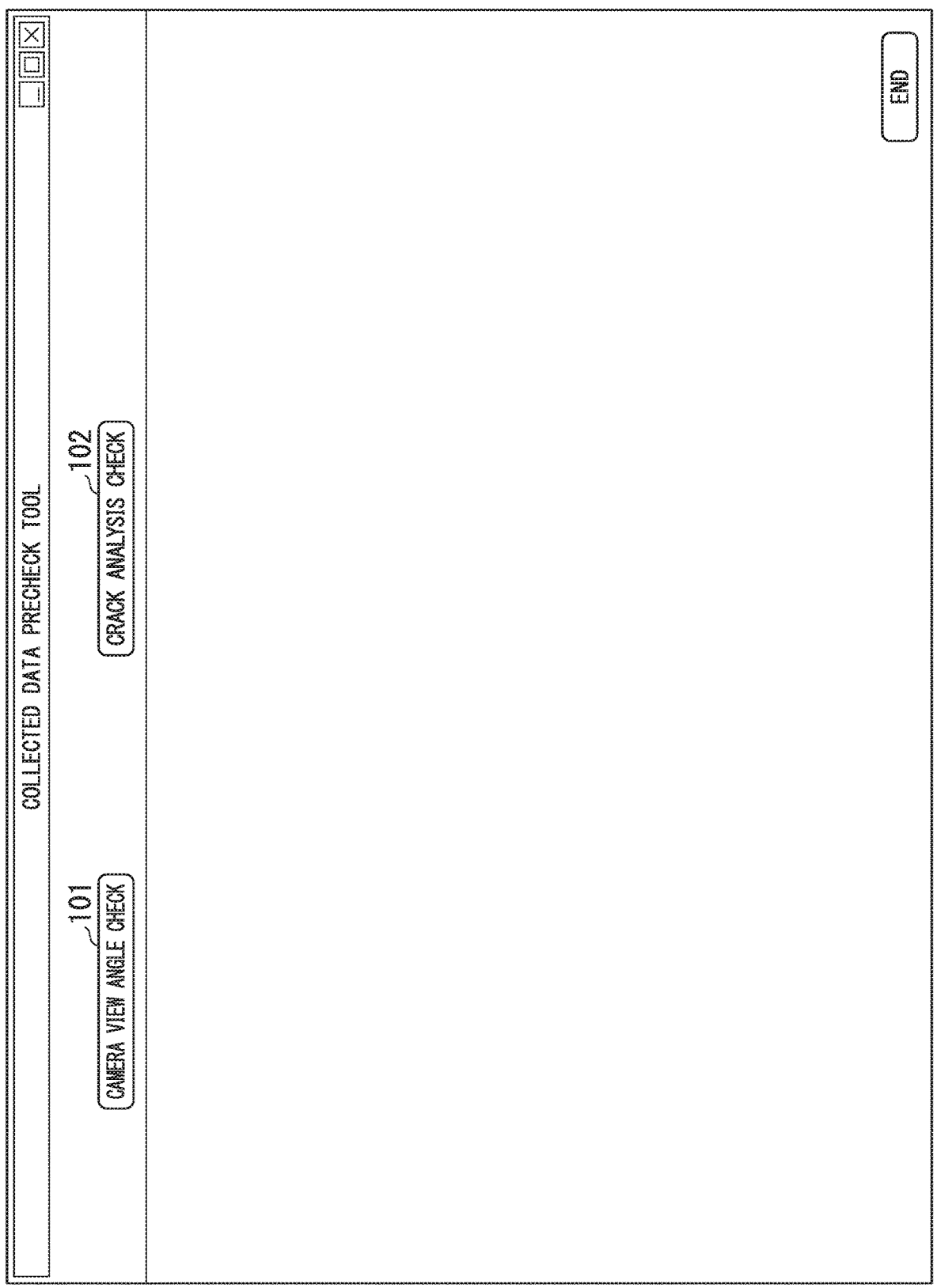
FIG. 4 is a diagram illustrating an example of a selection screen for allowing a judge process to be executed to be selected.

FIG. 4 is a diagram illustrating an example of a selection screen for selecting a judge process to be executed. As illustrated in FIG. 4, a camera view angle check button 101 and a crack analysis check button 102 are displayed on the selection screen. The camera view angle check button 101 is a button for executing a camera view angle judge process. When the camera view angle check button 101 is selected, the captured image check device 20 executes the processing of step S107. The crack analysis check button 102 is a button for executing a crack detection judge process. When the crack analysis check button 102 is selected, the captured image check device 20 executes the processing of step S108. Also, the processing of step S107 and the processing of step S108 can be performed in parallel. For example, when both the camera view angle check button 101 and the crack analysis check button 102 are selected, the captured image check device 20 executes the processing of step S107 and the process of step S108 as parallel processing.

Here, description of an example in which the camera view angle check button 101 is first selected will continue.

In step S107, the camera view angle judge processor 208 performs a camera view angle judge process on the basis of the still-image data 272. The camera view angle judge processor 208 generates an image in which a grid-like frame divided into predetermined partitions is superimposed on the still-image data and instructs the display controller 210 to cause the display 211 to display a screen on which the generated image and information about condition 1 are displayed. The display controller 210 causes the display 211 to display a screen illustrated in FIG. 5 in accordance with the instruction.

Figure 5:
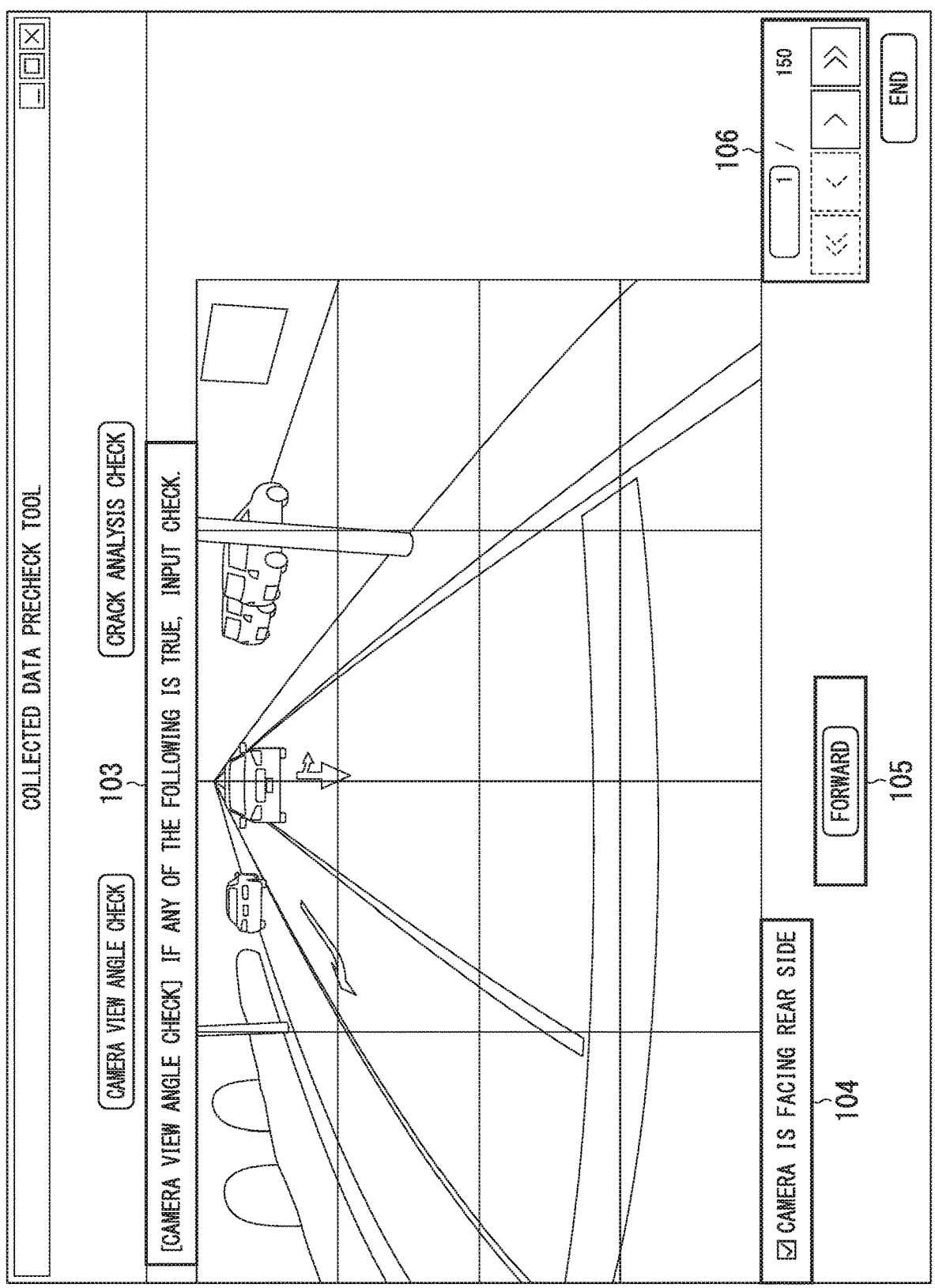
FIG. 5 is a diagram illustrating an example of a display screen related to checking of condition 1.

FIG. 5 is a diagram illustrating an example of a display screen related to checking of condition 1. Here, as an example of condition 1, a screen for checking that the camera 10 is facing a rear side appears. In FIG. 5, an instruction display region 103, a check box 104, a forward button 105, and an image switching button 106 as well as still-image data on which a grid-like frame is superimposed are displayed.

The instruction display region 103 is a region where an instruction for the user is displayed. The check box 104 is a region for inputting whether or not a condition (e.g., any one of conditions 1 to 4) is satisfied. In the example illustrated in FIG. 5, as an example of condition 1, it is shown that the camera 10 is facing a rear side.

If the user views the displayed image and determines that the condition is satisfied, a check mark is input to the check box 104 by the user. If the user views the displayed image and determines that the condition is not satisfied, a check mark is not input to the check box 104.

The forward button 105 is a button for proceeding to the judge of the next condition (e.g., conditions 2 to 4).

The image switching button 106 is a button for switching currently displayed still-image data to other still-image data. In the example illustrated in FIG. 5, it is shown that there are 150 pieces of still-image data in total and the still-image data currently displayed on the display 211 is first still-image data.

In FIG. 5, when the user selects the forward button 105, the camera view angle judge processor 208 instructs the display controller 210 to cause the display 211 to display a screen on which an image on which a grid-like frame divided into predetermined partitions is superimposed and information related to condition 2 are displayed. The display controller 210 causes the display 211 to display a screen illustrated in FIG. 6 in accordance with the instruction.

Figure 6:
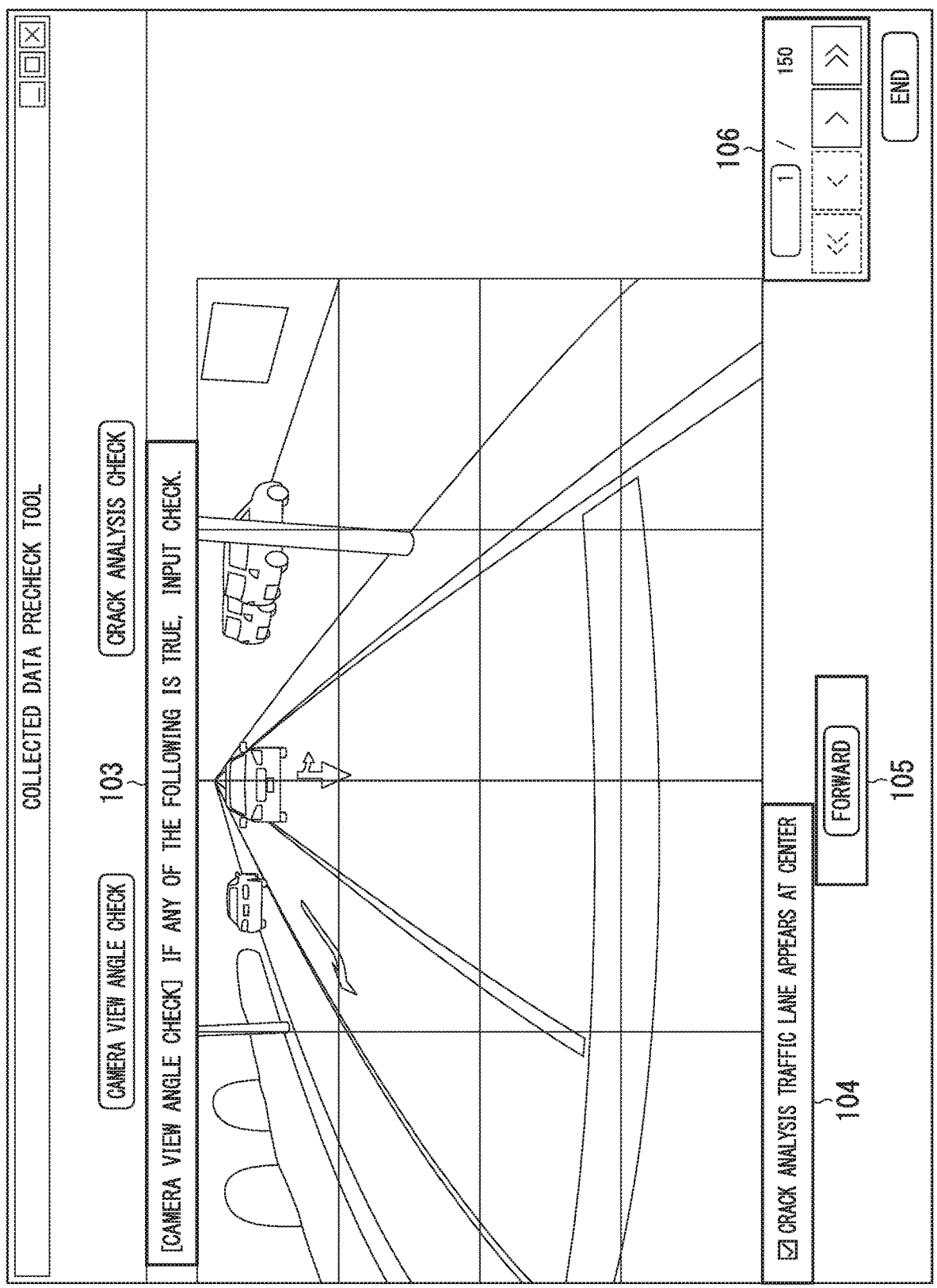
FIG. 6 is a diagram illustrating an example of a display screen related to checking of condition 2.

FIG. 6 is a diagram illustrating an example of a display screen related to checking of condition 2. Here, as an example of condition 2, it is assumed that a traffic lane for crack analysis appears at the center.

As illustrated in FIG. 6, a grid-like frame divided into predetermined partitions is superimposed on still-image data in the display screen related to condition 2. Also, in addition to the still-image data on which the grid-like frame is superimposed, an instruction display region 103, a check box 104, a forward button 105, and an image switching button 106 are displayed on the display screen related to condition 2. In the example illustrated in FIG. 6, it is indicated that a traffic lane for crack analysis appears at the center as a condition. If the user views the displayed image and determines that the condition is satisfied, a check mark is input to the check box 104 by the user. If the user views the displayed image and determines that the condition is not satisfied, a check mark is not input to the check box 104.

Figure 7:
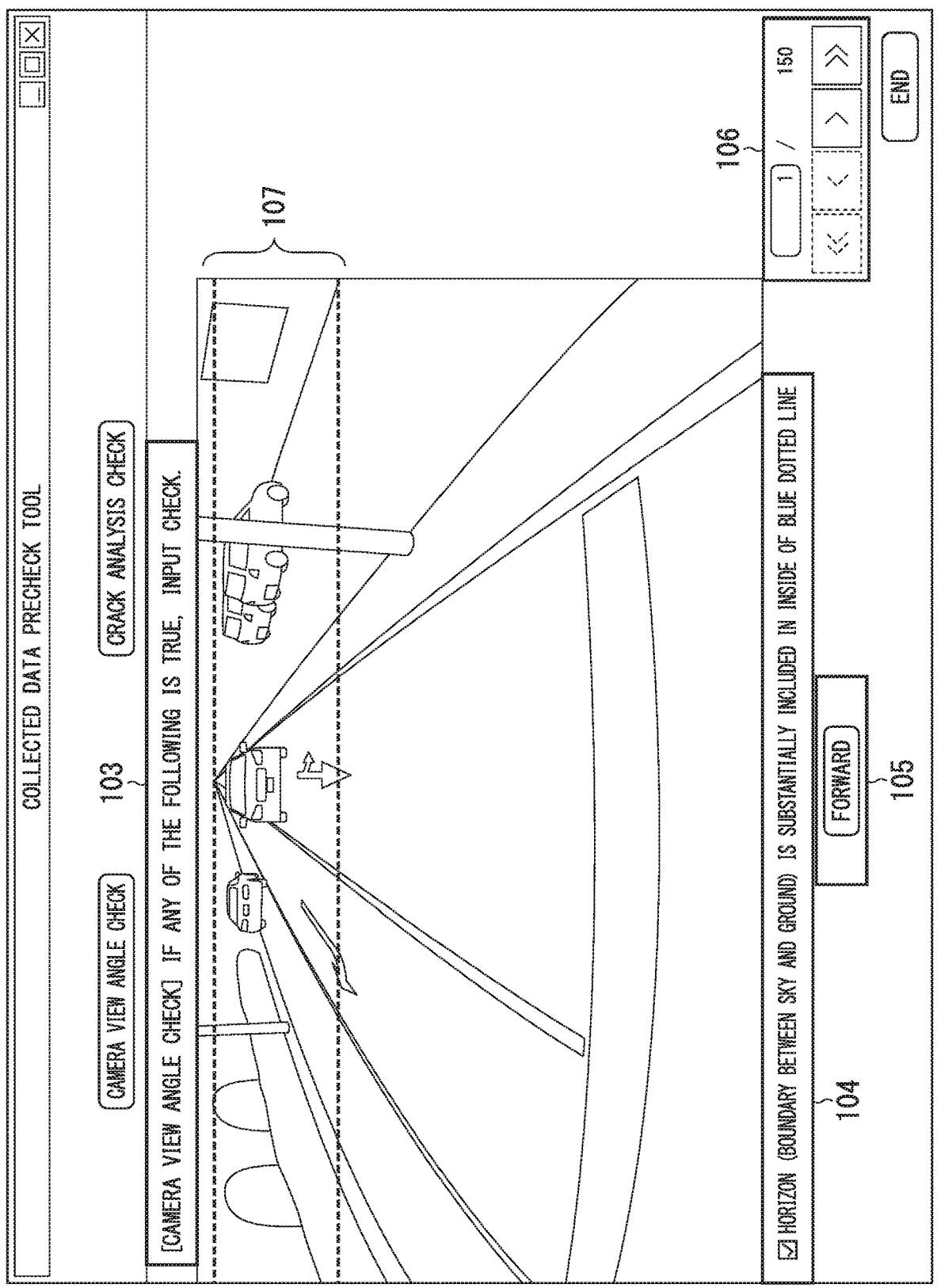
FIG. 7 is a diagram illustrating an example of a display screen related to checking of condition 3.

In FIG. 6, when the user selects the forward button 105, the camera view angle judge processor 208 instructs the display controller 210 to switch the screen illustrated in FIG. 6 to a screen illustrated in FIG. 7. Specifically, the camera view angle judge processor 208 generates an image in which a frame indicating a range in which a horizon is required to be photographed is superimposed on the still-image data and instructs the display controller 210 to cause the display 211 to display a screen on which the generated image and information about condition 3 are displayed. The display controller 210 causes the display 211 to display the screen illustrated in FIG. 7 in accordance with the instruction.

FIG. 7 is a diagram illustrating an example of a display screen related to checking of condition 3. Here, an example of condition 3 is checking of a position of a horizon.

As illustrated in FIG. 7, a frame 107 representing a range in which a horizon is required to be photographed is superimposed on still-image data on the display screen related to condition 3. In addition to the still-image data on which the frame 107 indicating the range in which the horizon is required to be photographed is superimposed, an instruction display region 103, a check box 104, a forward button 105, and an image switching button 106 are displayed on the display screen related to condition 3. If the user views the displayed image and determines that the condition is satisfied, a check mark is input to the check box 104 by the user. If the user views the displayed image and determines that the condition is not satisfied, a check mark is not input to the check box 104.

Figure 8:
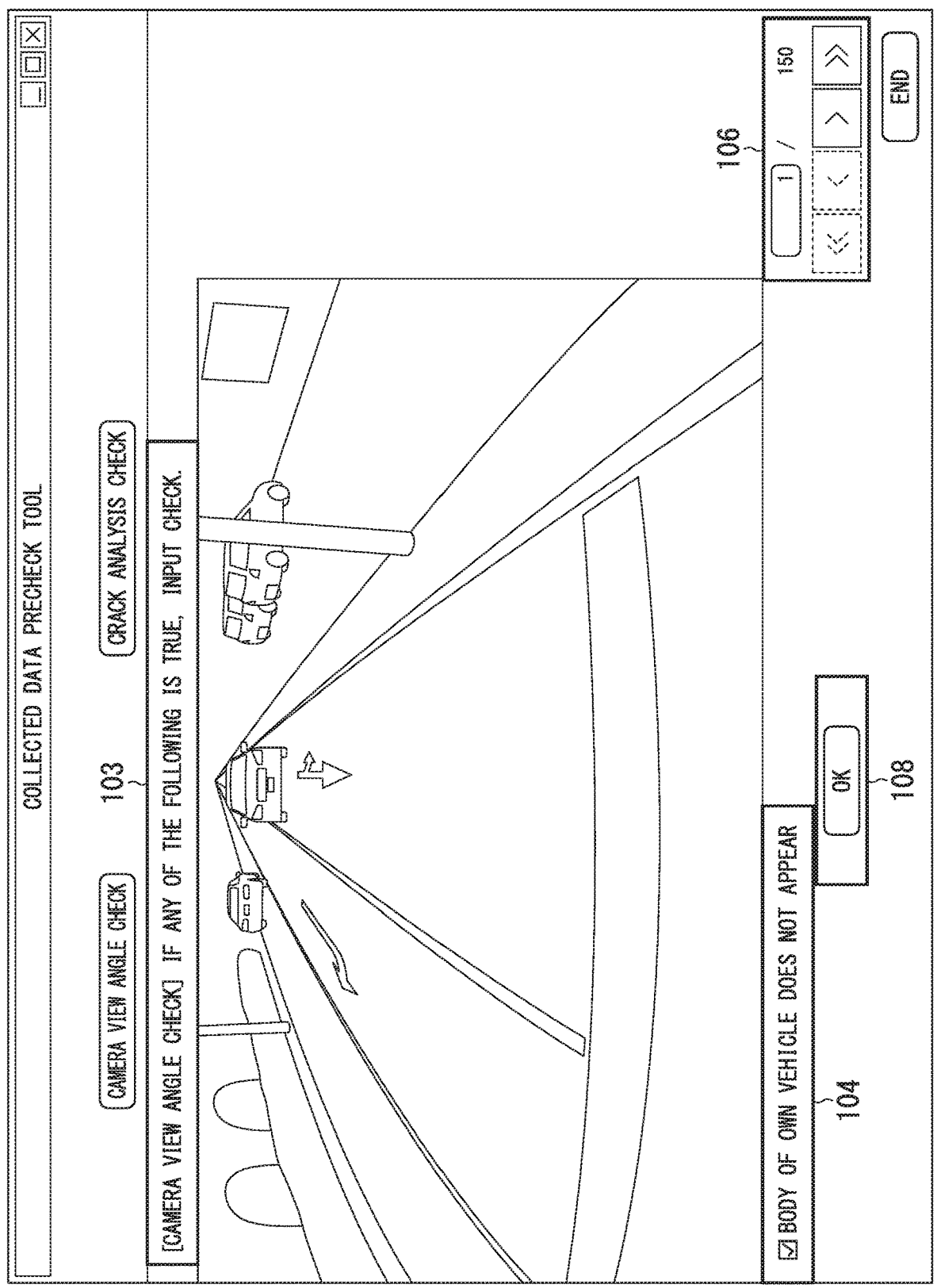
FIG. 8 is a diagram illustrating an example of a display screen related to checking of condition 4.

When the forward button 105 is selected by the user, the camera view angle judge processor 208 instructs the display controller 210 to switch the screen illustrated in FIG. 7 to a screen illustrated in FIG. 8. Specifically, the camera view angle judge processor 208 instructs the display controller 210 to cause the display 211 to display a screen on which still-image data and information about condition 4 are displayed. The display controller 210 causes the display 211 to display a screen illustrated in FIG. 8 in accordance with the instruction.

FIG. 8 is a diagram illustrating an example of a display screen related to checking of condition 4. Here, an example of condition 4 is checking of whether or not the body of an own vehicle appears.

As illustrated in FIG. 8, the display screen related to condition 4 is superimposed on still-image data. In addition to the still-image data, an instruction display region 103, a check box 104, an image switching button 106, and an OK button 108 are displayed on the display screen related to condition 4. The OK button 108 is a button selected when the camera view angle judge process is completed. If the user views the displayed image and determines that the condition is satisfied, a check mark is input to the check box 104 by the user. If the user views the displayed image and determines that the condition is not satisfied, a check mark is not input to the check box 104.

When the OK button 108 is selected by the user, the camera view angle judge processor 208 outputs a result input to the check box 104 in the judge process in FIGS. 5 to 8 to the road surface state analysis judge processor 209 as a result of the judge process. Thereafter, the camera view angle judge processor 208 causes the display controller 210 to display the selection screen and causes information indicating that the camera view angle judge process has been completed to be displayed next to the camera view angle check button 101.

Figure 9:
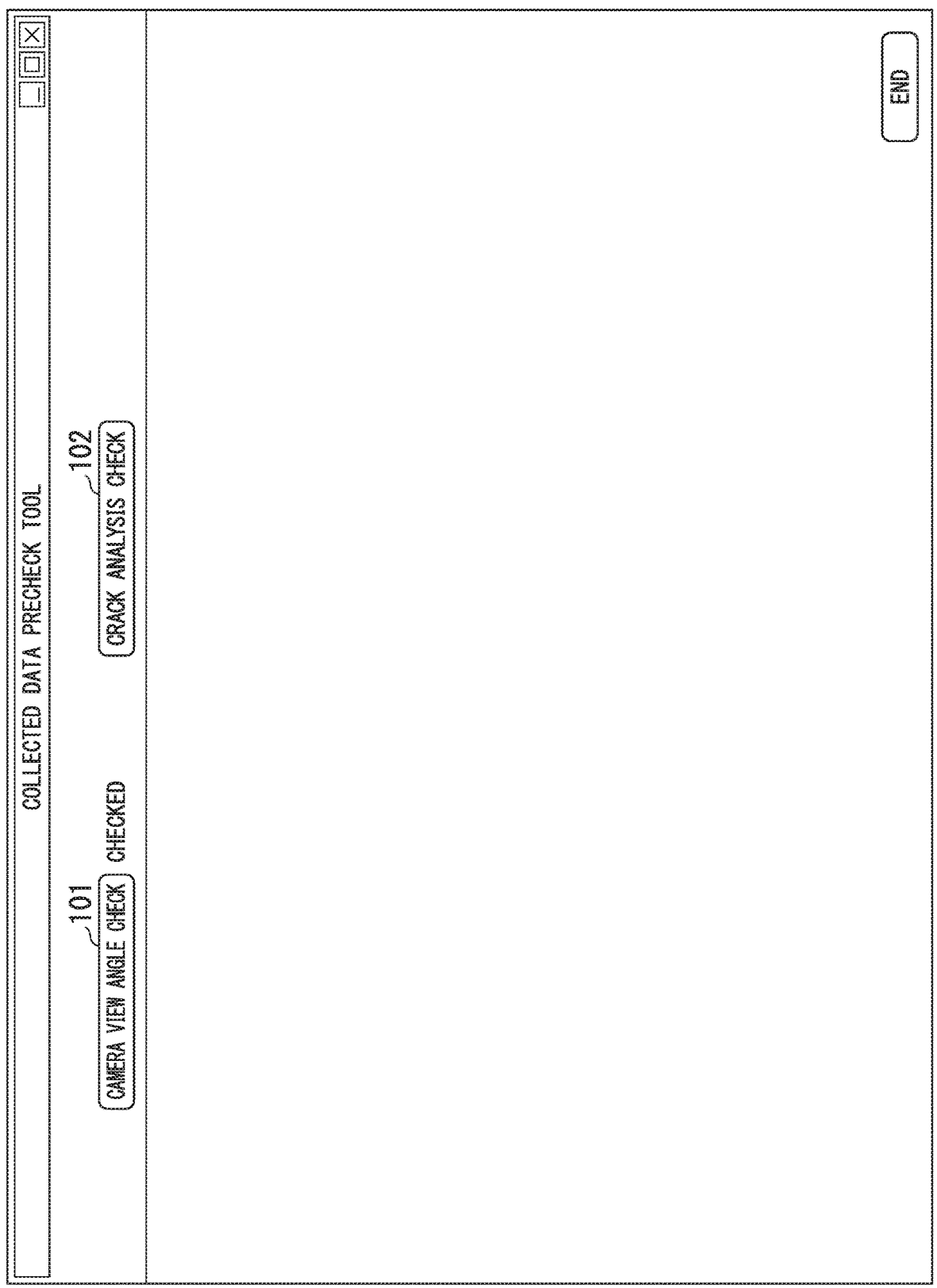
FIG. 9 is a diagram illustrating an example of a selection screen after a camera view angle judge process is completed.

FIG. 9 is a diagram illustrating an example of a selection screen after the camera view angle judge process is completed. As illustrated in FIG. 9, on the selection screen, "checked" is displayed next to the camera view angle check button 101 as information indicating that the camera view angle judge process has been completed. Next, the crack analysis check button 102 is assumed to be selected.

In parallel with the camera view angle judge process described above, a crack detection process is also performed.

In step S106, the crack analyzer 206 detects a crack on a road surface from still-image data by using the still-image data after conversion by the still-image converter 205. Thereafter, the crack analyzer 206 generates post-analysis still-image data by superimposing the detected crack on the still-image data. Also, if there are a plurality of pieces of still-image data, the crack analyzer 206 detects a crack from all the still-image data and generates a plurality of pieces of post-analysis still image data by superimposing the detected crack on the corresponding still-image data. The crack analyzer 206 stores the generated post-analysis still-image data as post-analysis still-image data 273 in the storage 207.

When the crack analysis check button 102 is selected, the process proceeds to step S108 and the road surface state analysis judge processor 209 performs a crack detection judge process. Also, step S108 is executed after the processing of step S106 is executed. The road surface state analysis judge processor 209 instructs the display controller 210 to cause the display 211 to display a screen on which the post-analysis still-image data 273 stored in the storage 207 and information about a condition in the crack detection judge process are displayed. The display controller 210 causes the display 211 to display the screen illustrated in FIG. 10 in accordance with the instruction.

Figure 10:
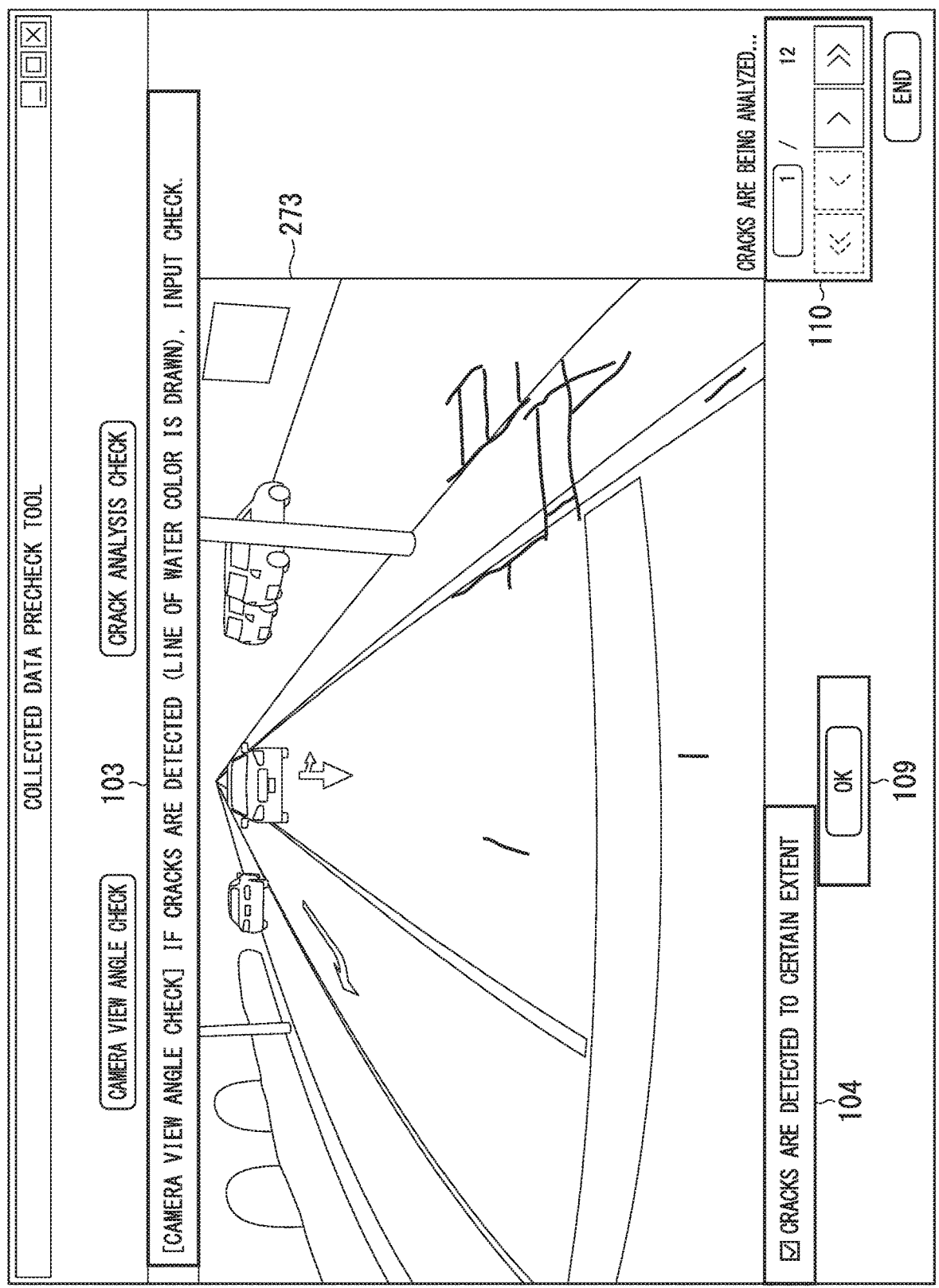
FIG. 10 is a view illustrating an example of a display screen of a crack detection judge process.

FIG. 10 is a diagram illustrating an example of a display screen of a crack detection judge process which is a second condition. As illustrated in FIG. 10, an instruction display region 103, a check box 104, an OK button 109, and an image switching button 110 are displayed on the display screen of the crack detection judge process in addition to the post-analysis still-image data 273. The OK button 109 is a button selected when the crack detection judge process is completed. The image switching button 110 is a button for switching the post-analysis still-image data 273 currently being displayed to other post-analysis still-image data 273.

The post-analysis still-image data 273 is displayed in the order of generation of post-analysis still-image data by the crack analyzer 206. In the example illustrated in FIG. 9, the total number of pieces of still-image data for which the post-analysis still-image data is currently generated by the crack analyzer 206 is 12 and the post-analysis still-image data 273 currently displayed on the display 211 is shown to be one piece of post-analysis still-image data. In the example illustrated in FIG. 10, it is shown that cracks are detected to some extent as a condition. If the user views the displayed image and determines that the condition is satisfied, a check mark is input to the check box 104 by the user. If the user views the displayed image and determines that the condition is not satisfied, a check mark is not input to the check box 104.

When the OK button 109 is selected by the user, the road surface state analysis judge processor 209 causes the display controller 210 to display the selection screen and causes information indicating that the crack detection judge process has been completed to be displayed next to the crack analysis check button 102.

Figure 11:
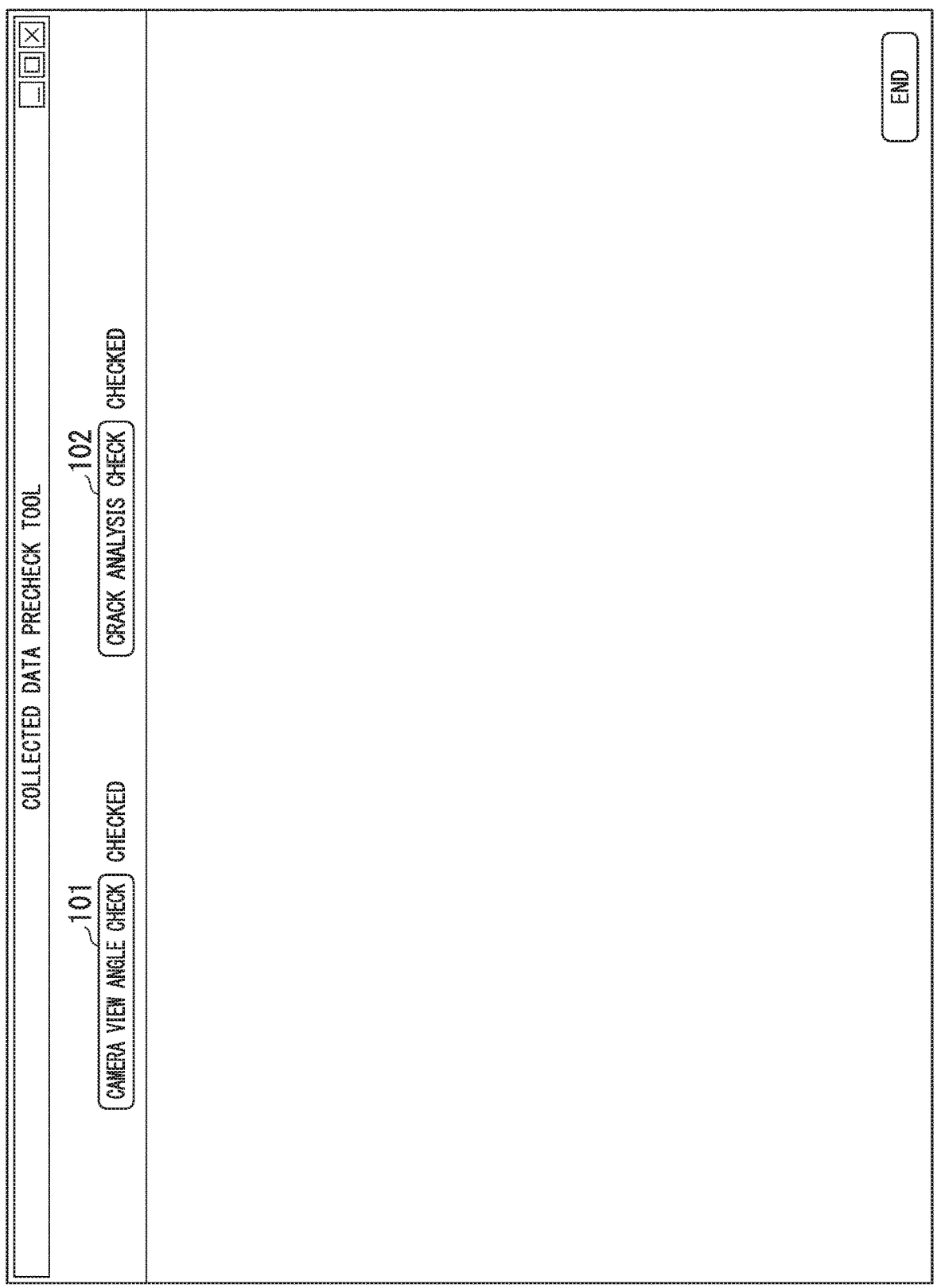
FIG. 11 is a diagram illustrating an example of a selection screen after the camera view angle judge process and the crack detection judge process are completed.

FIG. 11 is a diagram illustrating an example of a selection screen after the camera view angle judge process and the crack detection judge process are completed. As illustrated in FIG. 11, on the selection screen, "checked" is displayed as information indicating that the camera view angle judge process has been completed next to the camera view angle check button 101 and "checked" is displayed as information indicating that the crack detection judge process has been completed next to the crack analysis check button 102.

Thereafter, when the user selects an end button, the road surface state analysis judge processor 209 generates a checking result file in which a result of a judge process indicating a result input to the check box 104 and a result of a judge process output from the camera view angle judge processor 208 in the judge process in FIG. 10 are shown in step S109. The camera view angle judge processor 208 outputs the generated checking result file. The road surface state analysis judge processor 209 also instructs the display controller 210 to cause the display 211 to display the result of the judge process of the camera view angle judge processor 208 and the result of the crack detection judge process. The display controller 210 displays the result of the judge process of the camera view angle judge processor 208 and the result of the crack detection judge process.

According to the captured image check system 100 configured as described above, it is possible to analyze the damage/deterioration of the road surface immediately after measurement on the actual location, so that ascertaining the state of the road surface is not time-consuming. Also, because it is possible to check whether an angle of view and video quality of the camera 10 are suitable on the actual location, re-measurement can be performed on the actual location if they are not suitable. Thus, a backtracking operation can be reduced. Thus, it is possible to easily check whether or not the state of the road surface can be photographed with high accuracy.

Furthermore, a road administrator can easily ascertain the road surface crack management state by merely performing photographing using the camera 10 while patrolling a road, and the present invention can be also used for daily management of the road surface.

Modified Example of First Embodiment

Although a configuration in which the still-image converter 205 converts all processing target image data acquired by the image obtaining unit 203 into still-image data has been described in the present embodiment, the still-image converter 205 may be also configured to thin the processing target image data at predetermined intervals and convert processing target image data after thinning into still-image data.

According to such a configuration, it is possible to reduce a processing load because it is unnecessary to convert the entire moving image to still-image data even when the processing target image data is a long-time moving image.

Although the configuration in which image data of a moving image is obtained through photographing performed by the camera 10 has been described in the present embodiment, a configuration in which still-image data is obtained through photographing performed by the camera 10 may be adopted. In the case of such a configuration, the still-image converter 205 associates still-image data with clock time information and position information to store them as still-image data 272 in the storage 207 without converting the processing target image data acquired by the image data acquisitor 203 into the still-image data.

Although a configuration in which a user determines whether or not a condition is satisfied by viewing still-image data and post-analysis still-image data in the camera view angle judge process and the crack detection judge process has been described in the present embodiment, the captured image check device 20 may be configured to perform the camera view angle judge process and the crack detection judge process through image processing to determine whether or not the first condition and the second condition are satisfied.

If the still-image converter 205 is configured to directly acquire processing target image data from the image data acquisitor 203, the captured image check device 20 may not execute the processing of step S104 in the process of FIG. 3. In the case of such a configuration, the captured image check device 20 converts the processing target image data acquired by the image data acquisitor 203 in the processing of step S103 into still-image data through the still-image converter 205 in the processing of step S105.

Second Embodiment

A second embodiment is an embodiment in which a judge process is made using image data obtained through photographing performed by another photographing device equipped with a camera instead of a camera attached to a ceiling of a vehicle 2. An example of the photographing device equipped with the camera includes a drive recorder, a camera of a back monitor, a smartphone, a tablet terminal, and the like.

Figure 12:
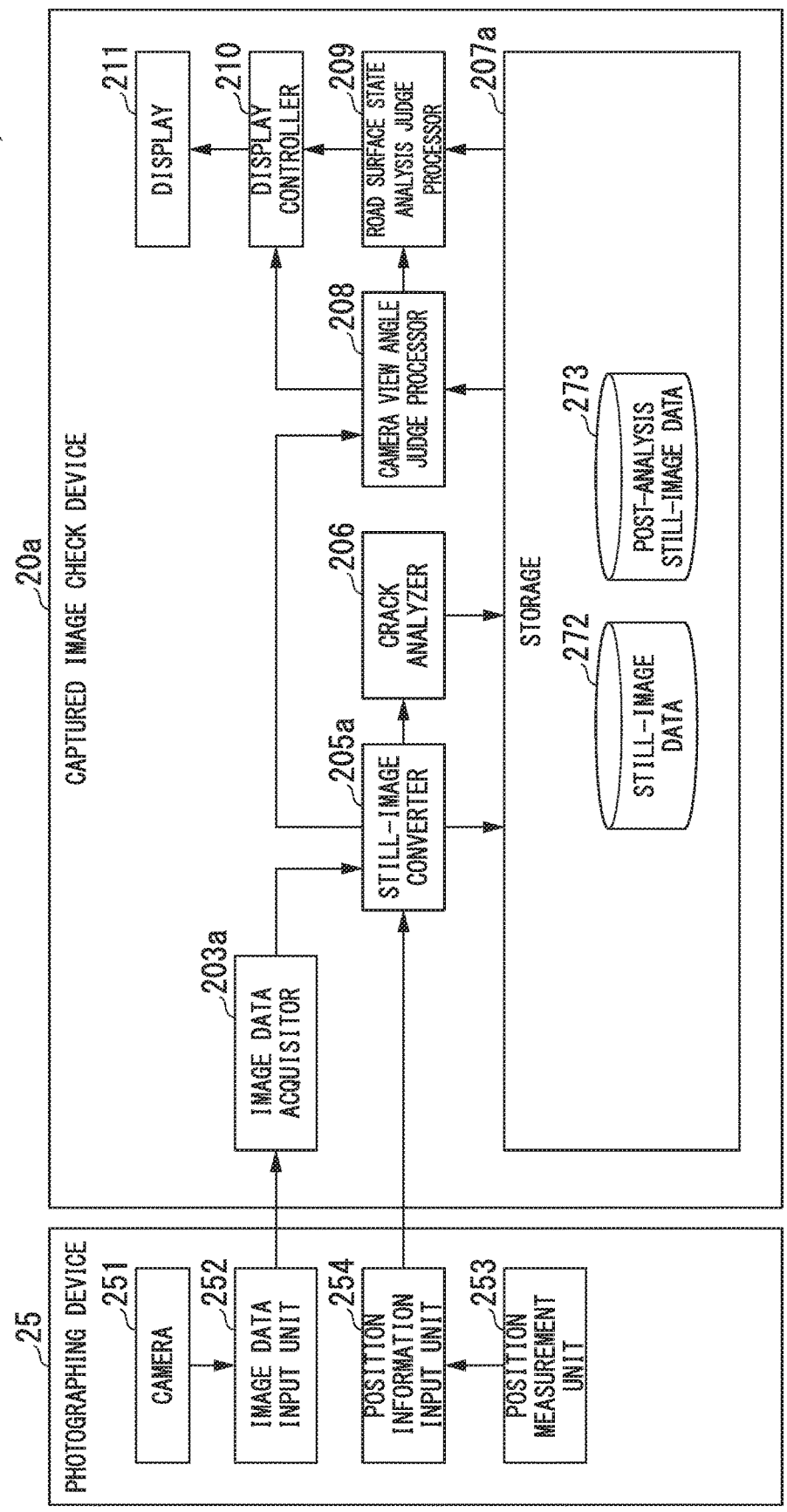
FIG. 12 is a diagram illustrating a system configuration of a captured image check system according to a second embodiment.

FIG. 12 is a diagram illustrating a system configuration of a captured image check system 100a in the second embodiment.

The captured image check system 100a includes a captured image check device 20a and a photographing device 25. The captured image check device 20a and the photographing device 25 are connected via, for example, a local area network (LAN). The photographing device 25 is a device including an internal camera and configured to photograph a road surface by using the camera. The photographing device 25 outputs image data of the road surface obtained through photographing using the camera to the captured image check device 20a. The captured image check device 20a is a device configured to input the image data output from the photographing device 25 and performs a pre judge process for analyzing a road surface state on the basis of the input image data. The captured image check device 20a and the photographing device 25 are installed within the vehicle 2 that travels on a road on which the road surface is photographed.

Hereinafter, configurations of the captured image check device 20a and the photographing device 25 will be described.

First, the configuration of the photographing device 25 will be described. The photographing device 25 includes a CPU, a memory, an auxiliary storage device, and the like connected by a bus and executes an image capturing program. By executing the image capturing program, the photographing device 25 functions as a device including a camera 251, an image data input unit 252, a position measurement unit 253, and a position information input unit 254. Also, all or some of functions of the photographing device 25 may be implemented using hardware such as an ASIC, a PLD, or an FPGA. The image capturing program may be recorded on a computer-readable recording medium. Also, the computer-readable recording medium is a storage device such as a flexible disk, a magneto-optical disc, a ROM, a portable medium such as a CD-ROM, or a hard disk embedded in a computer system. The image capturing program may be transmitted and received via an electrical communication circuit.

The camera 251 photographs a road surface that is a road surface state analysis target. More specifically, the camera 251 photographs the road surface in a state in which the road surface that is the road surface state analysis target can be photographed. Image data obtained through photographing performed by the camera 251 may be image data of a still image or image data of a moving image. In the present embodiment, a case in which the camera 251 photographs the road surface in a moving image will be described as an example.

The image data input unit 252a is a functional unit configured to input image data of the road surface of the moving image captured by the camera 251. That is, the image data input unit 252a is a functional unit configured to input image data that is obtained through photographing performed by the camera 251 and used for analyzing a state of the road surface. The image data input unit 252a outputs the input image data to the image data acquisitor 203a.

The position measurement unit 253 is a functional unit configured to measure a position by using a GPS.

The position information input unit 254 is a functional unit configured to input position information (e.g., latitude/longitude information) measured by the position measurement unit 253. The position information input unit 254 outputs the measured position information to the still-image converter 205a.

Next, the configuration of the captured image check device 20a will be described. The captured image check device 20a includes a CPU, a memory, an auxiliary storage device, and the like connected by a bus, and executes a captured image check program. By the execution of the captured image check program, the captured image check device 20a functions as a device including the image data acquisitor 203a, the still-image converter 205a, a crack analyzer 206, a storage 207a, a camera view angle judge processor 208, a road surface state analysis judge processor 209, a display controller 210, and a display 211. Also, all or some of functions of the captured image check device 20a may be implemented using hardware such as an ASIC, a PLD, or an FPGA. The captured image check program may be recorded on a computer-readable recording medium. Also, the computer-readable recording medium is a storage device such as a flexible disk, a magneto-optical disc, a ROM, a portable medium such as a CD-ROM, or a hard disk embedded in a computer system. The captured image check program may be transmitted and received via an electrical communication circuit.

The captured image check device 20a is different from the captured image check device 20 in that the captured image check device 20a includes the image data acquisitor 203a, the still-image converter 205a, and the storage 207a in place of the image data acquisitor 203, the still-image converter 205, and the storage 207 and does not include the image data input unit 201, the clock time information input unit 202, and the GPS data retrieval unit 204. The captured image check device 20a is similar to the captured image check device 20 in terms of other configurations. Thus, description of the entire captured image check device 20a will be omitted and the image data acquisitor 203a, the still-image converter 205a, and the storage 207a will be described.

The image data acquisitor 203a acquires image data input to the image data input unit 252 as processing target image data.

The still-image converter 205a is a functional unit configured to convert the processing target image data acquired by the image data acquisitor 203a into still-image data. The still-image converter 205a associates the still-image data with clock time information and position information input by the position information input unit 254 to store them in the storage 207a.

The storage 207a stores still-image data 272 and post-analysis still-image data 273. The storage 207a is configured using a storage device such as a magnetic hard disk device or a semiconductor storage device.

Figure 13:
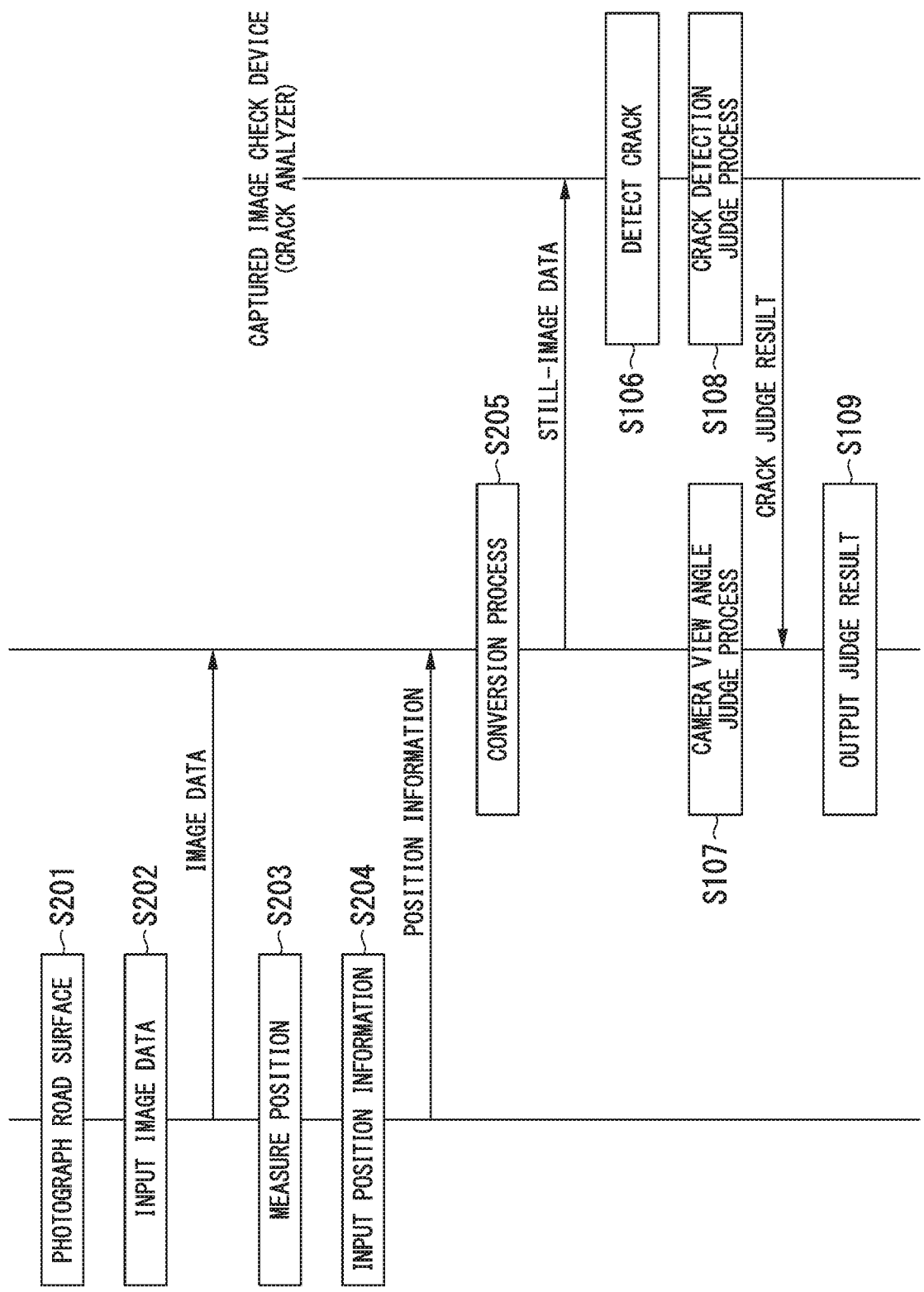
FIG. 13 is a sequence diagram illustrating a flow of a process of the captured image check system according to the second embodiment.

FIG. 13 is a sequence diagram illustrating a flow of a process of the captured image check system 100a in the second embodiment. In FIG. 13, reference signs similar to those of FIG. 3 are assigned to processing similar to that of FIG. 3 and description thereof will be omitted. Also, the camera view angle judge process and the crack detection judge process performed by the captured image check device 20a illustrated in HG 13 may be executed by the same device or the judge processes may be executed by separate devices. In FIG. 13, a case in which the camera view angle judge process and the crack detection judge process are executed by the same device will be described as an example.

In step S201, the camera 251 of the photographing device 25 photographs a road surface in a moving image according to an operation of a user. The camera 251 outputs image data of the road surface of the captured moving image to the image data input unit 252. Also, the image data of the road surface includes clock time information related to a clock time at which the road surface was photographed. In step S202, the image data input unit 252 inputs the image data of the moving image captured by the camera 251. The image data input unit 252 outputs the image data of the input moving image to the captured image check device 20a.

The image data acquisitor 203a of the captured image check device 20a acquires the image data input to the image data input unit 252 as processing target image data.

Next, in step S203, the position measurement unit 253 measures a position when the camera 251 performs photographing. The position measurement unit 253 outputs a position measurement result to the position information input unit 254. Next, in step S204, the position information input unit 254 inputs position information obtained through measurement performed by the position measurement unit 253. The position information input unit 254 outputs the input position information to the captured image check device 20a.

Next, in step S205, the still-image converter 205a converts the processing target image data acquired by the image data acquisitor 203a into still-image data. The still-image converter 205a associates the still-image data with the clock time information and the position information obtained from the position information input unit 254 to store them as the still-image data 272 in the storage 207a. Thereafter, the camera view angle judge process of step S107, the crack detection process of step S106, and processes subsequent thereto is executed.

According to the captured image check system 100a configured as described above, it is possible to obtain an effect similar to that of the first embodiment.

Also, in the captured image check system 100a, it is possible to easily check whether or not the state of the road surface can be photographed with high accuracy also in the photographing device 25 having a built-in camera that can be carried around by the user instead of a fixed camera.

Furthermore, if a road administrator brings the photographing device 25 having the built-in camera 251 that can be carried around while patrolling a road, it is possible to easily ascertain a road surface crack management state by using the photographing device 25 and use the photographing device 25 also for daily management of the road surface.

Modified Example of Second Embodiment

Although a configuration in which the still-image converter 205a converts all processing target image data acquired by the image data acquisitor 203a into still-image data has been described in the present embodiment, it is also possible to thin the processing target image data at predetermined intervals and convert processing target image data after thinning into still-image data.

According to the configuration as described above, it is possible to reduce a processing load because it is unnecessary to convert the entire moving image to still-image data even when the processing target image data is a long-time moving image.

Although the configuration in which image data of a moving image is obtained through photographing performed by the camera 251 has been described in the present embodiment, a configuration in which still-image data is obtained through photographing performed by the camera 251 may be adopted. In the case of such a configuration, the still-image converter 205a associates the still-image data with clock time information and position information to store them as still-image data 272 in the storage 207a without converting the processing target image data acquired by the image data acquisitor 203a into still-image data.

The captured image check device 20a may be configured to display results (an analysis image and a degree of deterioration) on a map by using the post-analysis still-image data 273 and the position information.

Although a configuration in which a user determines whether or not a condition is satisfied by viewing still-image data and post-analysis still-image data in the camera view angle judge process and the crack detection judge process has been described in the present embodiment, the captured image check device 20a may be configured to perform the camera view angle judge process and the crack detection judge process through image processing to determine whether or not the first condition and the second condition are satisfied.

The photographing device 25 and the captured image check device 20a may be configured to be integrated into a single device.

Third Embodiment

The third embodiment is an embodiment in which a judge process using image data is performed by a server on a cloud.

Figure 14:
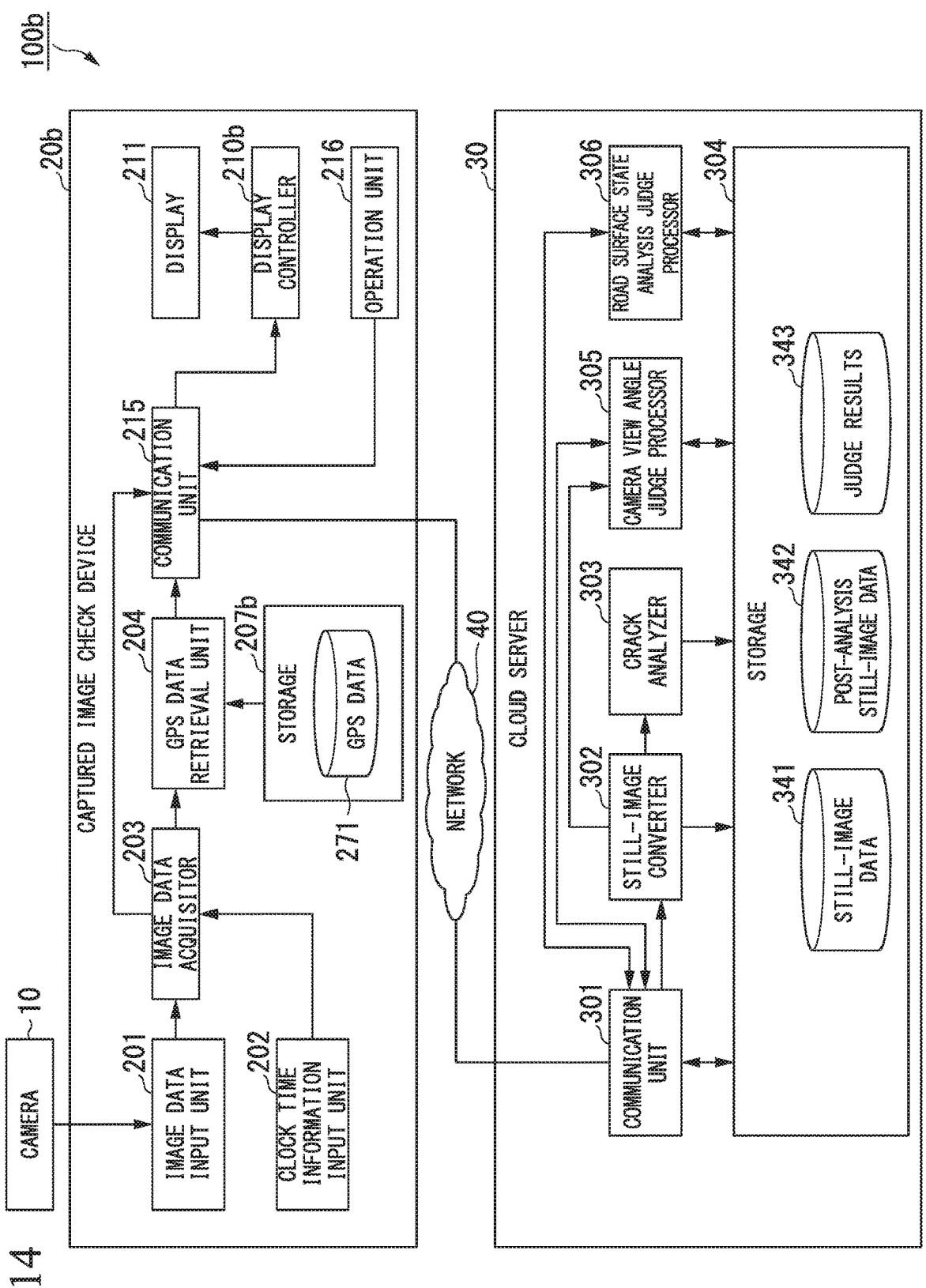
FIG. 14 is a diagram illustrating a system configuration of a captured image check system according to a third embodiment.

FIG. 14 is a diagram illustrating a system configuration of a captured image check system 100b according to the third embodiment.

The captured image check system 100b includes a camera 10, a captured image check device 20b, and a cloud server 30.

The camera 10 photographs a road surface that is a road surface state analysis target.

The captured image check device 20b is a device configured to transmit image data obtained through photographing performed by the camera 10 to the cloud server 30 and acquire and display a result of a pre judge process for analyzing a road surface state from the cloud server 30 in response to a user's request. A connection between the camera 10 and the captured image check device 20b may be either a wired connection or a wireless connection. The captured image check device 20b is provided within a vehicle 2 that travels on a road on which a road surface is photographed.

The cloud server 30 is a device configured to input image data transmitted from the captured image check device 20b and perform a pre judge process for analyzing a road surface state on the basis of the input image data. The cloud server 30 is an external device provided in a place different from that of the road on which the road surface is photographed.

Hereinafter, specific configurations of the captured image check device 20b and the cloud server 30 will be described below.

First, a configuration of the captured image check device 20b will be described. The captured image check device 20b includes a CPU, a memory, an auxiliary storage device, and the like connected by a bus, and executes a captured image check program. According to execution of the captured image check program, the captured image check device 20b function as a device including an image data input unit 201, a time information input unit 202, a image data acquisitor 203, a GPS data retrieval unit 204, a storage 207b, a display controller 210b, a display 211, a communication unit 215, and an operation unit 216. Also, all or some of functions of the captured image check device 20b may be implemented using hardware such as an ASIC, a PLD, or an FPGA. The captured image check program may be recorded on a computer-readable recording medium. Also, the computer-readable recording medium is a storage device such as a flexible disk, a magneto-optical disc, a ROM, a portable medium such as a CD-ROM, or a hard disk embedded in a computer system. The captured image check program may be transmitted and received via an electrical communication circuit.

The captured image check device 20b is different from the captured image check device 20 in that the captured image check device 20b includes the storage 207b and the display controller 210b in place of the storage 207 and the display controller 210, newly includes the communication unit 215 and the operation unit 216, and does not include the still-image converter 205, the crack analyzer 206, the camera view angle judge processor 208, and the road surface state analysis judge processor 209. The captured image check device 20b is similar to the captured image check device 20 in terms of other configurations. Thus, description of the entire captured image check device 20b will be omitted and the storage 207b, the display controller 210b, the communication unit 215, and the operation unit 216 will be described.

The storage 207b is a functional unit configured to store GPS data 271. The storage 207b is configured using a storage device such as a magnetic hard disk device or a semiconductor storage device.

The communication unit 215 is a functional unit configured to communicate with the cloud server 30 via a network. The network is, for example, 5G. The communication unit 215 transmits processing target image data, clock time information, and position information output from the GPS data retrieval unit 204 to the cloud server 30. Also, when the processing target image data is directly acquired from the image data acquisitor 203, the communication unit 215 transmits the still-image data and the clock time information to the cloud server 30. Also, the communication unit 215 receives results of judge processes (a camera view angle judge process and a crack detection judge process) from the cloud server 30 in accordance with an instruction input via the operation unit 216.

The display controller 210b is a functional unit configured to cause the display 211 to display the results of the judge processes received by the communication unit 215.

The operation unit 216 is a functional unit configured to receive an input from the user. For example, the operation unit 216 receives an input of an instruction for acquiring the results of judge processes from the user. The operation unit 216 is configured using existing input devices such as a keyboard, a pointing device (a mouse, a tablet, or the like), a touch panel, and a button.

Next, a configuration of the cloud server 30 will be described.

The cloud server 30 includes a CPU, a memory, an auxiliary storage device, and the like connected by a bus, and executes a captured image check program. By executing the captured image check program, the cloud server 30 functions as a device including a communication unit 301, a still-image converter 302, a crack analyzer 303, a storage 304, a camera view angle judge processor 305, and a road surface state analysis judge processor 306. Also, all or some of functions of the cloud server 30 may be implemented using hardware such as an ASIC, a PLD, or an FPGA. The captured image check program may be recorded on a computer-readable recording medium. Also, the computer-readable recording medium is a storage device such as a flexible disk, a magneto-optical disc, a ROM, a portable medium such as a CD-ROM, or a hard disk embedded in a computer system. The captured image check program may be transmitted and received via an electrical communication circuit.

The communication unit 301 is a functional unit configured to communicate with the captured image check device 20b via a network. The communication unit 301 receives processing target image data, clock time information, and position information or processing target image data and clock time information transmitted from the captured image check device 20*b*. Also, in response to a request from the captured image check device 20*b*, the communication unit 301 transmits the results of the judge processes to the captured image check device 20*b*.

The still-image converter 302 is a functional unit configured to convert the processing target image data received by the communication unit 301 into still-image data. The still-image converter 302 associates the still-image data with the clock time information and the position information to store them in the storage 304. When only the clock time information is associated with the processing target image data received by the communication unit 301, the still-image converter 302 associates the still-image data with the clock time information to store them in the storage 304. Furthermore, the still-image converter 302 also outputs the still-image data to the crack analyzer 303 and the camera view angle judge processor 305.

The crack analyzer 303 is a functional unit configured to detect a crack on the road surface from the still-image data by using the still-image data after conversion by the still-image converter 302. Also, the crack analyzer 303 generates post-analysis still-image data by superimposing the detected crack on the still-image data.

The storage 304 stores still-image data 341, post-analysis still-image data 342, and judge results 343. The storage 304 is configured using a storage device such as a magnetic hard disk device or a semiconductor storage device. The judge results 343 are results of the judge processes of the camera view angle judge processor 305 and the road surface state analysis judge processor 306.

The camera view angle judge processor 305 is a functional unit configured to perform the camera view angle judge process on the basis of the still-image data after conversion by the still-image converter 302. The camera view angle judge process performed by the camera view angle judge processor 305 is similar to the camera view angle judge process performed by the camera view angle judge processor 208.

The road surface state analysis judge processor 306 is a functional unit having a function of automatically determining whether or not a crack is detected, and performs the crack detection judge process on the basis of the still-image data 341 after conversion by the still-image converter 302. The crack detection judge process performed by the road surface state analysis judge processor 306 is similar to the crack detection judge process performed by the road surface state analysis judge processor 209.

Figure 15:
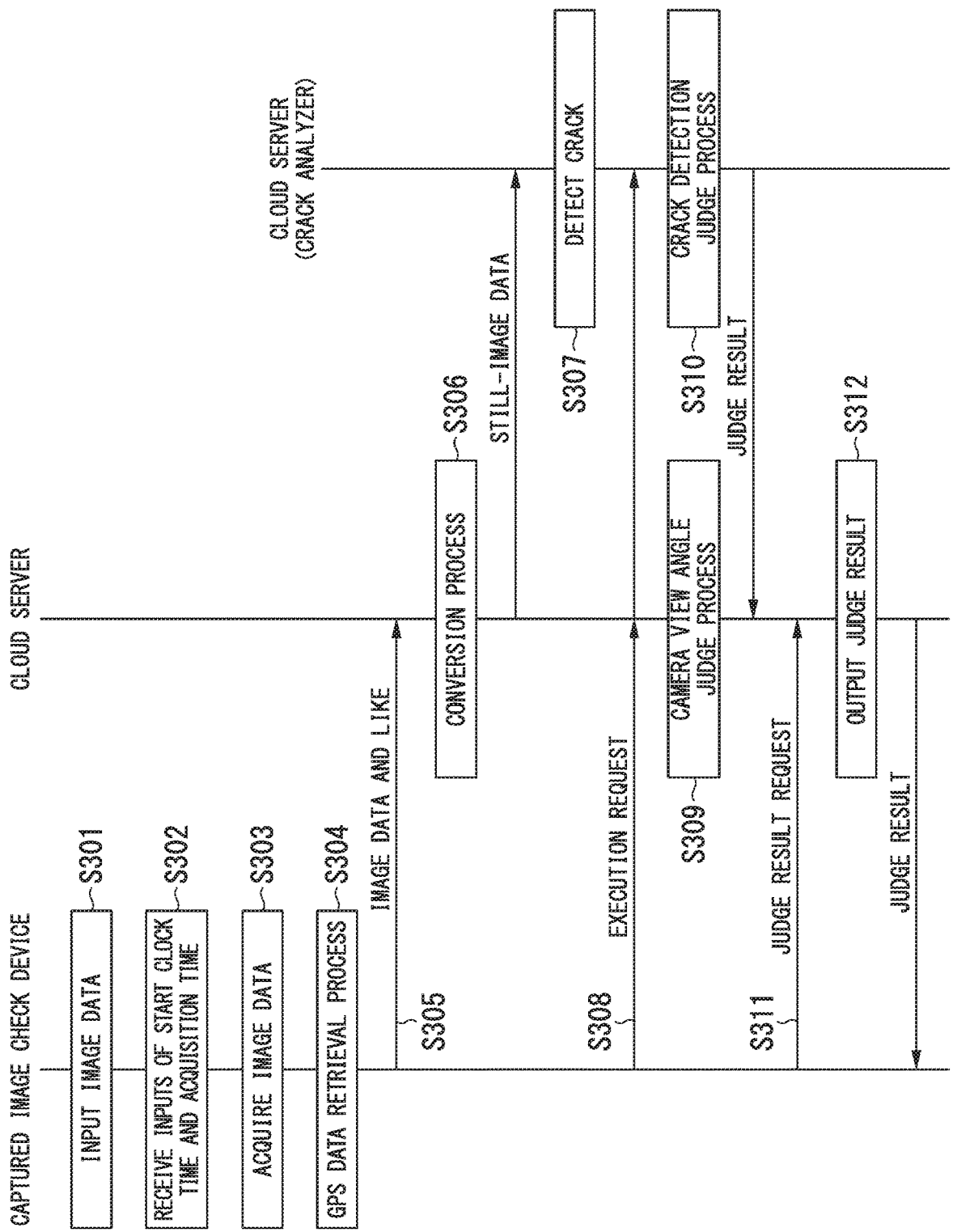
FIG. 15 is a sequence diagram illustrating a flow of a process of the captured image check system according to the third embodiment.

FIG. 15 is a sequence diagram illustrating a flow of a process of the captured image check system 100*b* according to the third embodiment. Also, the camera view angle judge process and the crack detection judge process performed by the cloud server 30 illustrated in FIG. 15 may be executed by the same device or the judge processes may be executed by separate devices. In FIG. 15, a case in which the camera view angle judge process and the crack detection judge process are executed by the same device will be described as an example.

In step S301, the image data input unit 201 of the captured image check device 20*b* inputs image data of a moving image captured by the camera 10. The image data input unit 201 outputs the image data of the input moving image to the image data acquisitor 203.

Next, in step S302, the clock time information input unit 202 receives inputs of a start clock time and an acquisition time for a moving image. For example, the clock time information input unit 202 receives the inputs of the start clock time and the acquisition time from an external device such as a keyboard. The clock time information input unit 202 outputs information of the input start clock time and acquisition time to the image data acquisitor 203.

Next, in step S303, the image data acquisitor 203 acquires image data for the acquisition time based on the start clock time from the moving image on the basis of the image data of the moving image output from the image data input unit 201 and the information of the start clock time and the acquisition time output from the clock time information input unit 202. The image data acquisitor 203 outputs acquired processing target image data to the GPS data retrieval unit 204.

Next, in step S304, the GPS data retrieval unit 204 retrieves the GPS data 271 corresponding to a clock time indicated by the clock time information of the processing target image data from the storage 207*b* with reference to the clock time information of the processing target image data acquired by the image data acquisitor 203. If the GPS data can be retrieved, the GPS data retrieval unit 204 outputs the processing target image data, the clock time information, and the position information acquired by the image data acquisitor 203 to the communication unit 215. On the other hand, if the GPS data retrieval unit 204 cannot retrieve the GPS data, the GPS data retrieval unit 204 outputs an error and causes the process of FIG. 15 to be terminated.

Next, in step S305, the communication unit 215 associates the processing target image data with the clock time information and the position information output from the GPS data retrieval unit 204 and transmits them to the cloud server 30.

The communication unit 301 of the cloud server 30 receives the processing target image data, the clock time information, and the position information transmitted from the captured image check device 20*b*. The communication unit 301 outputs the received processing target image data, clock time information, and position information to the still-image converter 302.

In step S306, the still-image converter 302 converts the processing target image data output from the communication unit 301 into still-image data.

The still-image converter 302 associates the still-image data with the clock time information and the position information to store them as still-image data 341 in the storage 304. Also, the still-image converter 302 outputs still-image data after conversion to the crack analyzer 303 and the camera view angle judge processor 305.

Thereafter, in step S307, the crack analyzer 303 detects a crack on the road surface from the still-image data by using the still-image data after conversion by the still-image converter 302. Thereafter, the crack analyzer 303 generates post-analysis still-image data by superimposing the detected crack on the still-image data. If there are a plurality of pieces of still-image data, the crack analyzer 303 detects a crack from all the still-image data and superimposes the detected crack on the corresponding still-image data, thereby generating a plurality of pieces of post-analysis still-image data. The crack analyzer 303 stores the generated post-analysis still-image data as the post-analysis still-image data 342 in the storage 207.

In step S308, when an instruction for requesting execution of a judge process is input from the user, the operation unit 216 of the captured image check device 20*b* transmits an execution request to the cloud server 30 via the communication unit 215. The execution request is a request for causing the cloud server 30 to execute the judge process.

The communication unit 301 of the cloud server 30 receives the execution request transmitted from the captured image check device 20b. The communication unit 301 outputs the received execution request to the camera view angle judge processor 305 and the road surface state analysis judge processor 306. When the execution request is received by the communication unit 301, the camera view angle judge processor 305 controls the communication unit 301 to transmit a notification for causing the captured image check device 20b to display a screen illustrated in FIG. 4 to the captured image check device 20b.

The communication unit 215 of the captured image check device 20b receives the notification transmitted from the cloud server 30. The display controller 210b causes the display 211 to display the screen illustrated in FIG. 4 in accordance with the notification received by the communication unit 215. When the camera view angle check button 101 illustrated in FIG. 4 is selected, the cloud server 30 executes the processing of step S309. Also, when the crack analysis check button 102 illustrated in FIG. 4 is selected, the cloud server 30 executes the processing of step S310. Also, the processing of step S309 and the processing of step S310 can be performed in parallel. For example, when the two buttons of the camera view angle check button 101 and the crack analysis check button 102 are selected, the cloud server 30 executes the processing of step S309 and the processing of step S310 as parallel processing.

When the camera view angle check button 101 is selected on the screen illustrated in FIG. 4, the communication unit 215 of the captured image check device 20b transmits a notification indicating that the camera view angle check button 101 has been selected to the cloud server 30. When the crack analysis check button 102 is selected on the screen illustrated in FIG. 4, the communication unit 215 of the captured image check device 20b transmits a notification indicating that the crack analysis check button 102 has been selected to the cloud server 30.

The communication unit 301 of the cloud server 30 receives the notification transmitted from the captured image check device 20b. When the received notification indicates that the camera view angle check button 101 has been selected, the communication unit 301 outputs the received notification to the camera view angle judge processor 305. Also, the communication unit 301 of the cloud server 30 receives the notification transmitted from the captured image check device 20b. If the received notification indicates that the crack analysis check button 102 has been selected, the communication unit 301 outputs the received notification to the road surface state analysis judge processor 306.

In step S309, if a notification indicating that the camera view angle check button 101 has been selected has been received, the camera view angle judge processor 305 performs the camera view angle judge process on the basis of the still-image data 341. Specifically, the camera view angle judge processor 305 controls the communication unit 301 to transmit a notification for causing the captured image check device 20b to display the screen illustrated in FIG. 5 to the captured image check device 20b.

If the notification for causing the captured image check device 20b to display the screen illustrated in FIG. 5 has been received from the cloud server 30, the display controller 210b of the captured image check device 20b causes the display 211 to display the screen illustrated in FIG. 5 and receives an input from the user. When the input from the user is made, the communication unit 215 transmits a notification including an input result to the cloud server 30.

Also, for example, if a notification indicating that the forward button 105 has been selected on the screen illustrated in FIG. 5 has been received, the camera view angle judge processor 305 controls the communication unit 301 to transmit the notification for causing the captured image check device 20b to display the screen illustrated in FIG. 6 to the captured image check device 20b.

If the notification for causing the captured image check device 20b to display the screen illustrated in FIG. 6 has been received from the cloud server 30, the display controller 210b of the captured image check device 20b causes the display 211 to display the screen illustrated in FIG. 6 and receives an input from the user. When an input from the user is made, the communication unit 215 transmits a notification including an input result to the cloud server 30.

Also, for example, if a notification indicating that the forward button 105 has been selected on the screen illustrated in FIG. 6 has been received, the camera view angle judge processor 305 controls the communication unit 301 to transmit a notification for causing the captured image check device 20b to display a screen illustrated in FIG. 7 to the captured image check device 20b.

If the notification for causing the captured image check device 20b to display the screen illustrated in FIG. 7 has been received from the cloud server 30, the display controller 210b of the captured image check device 20b causes the display 211 to display the screen illustrated in FIG. 7 and receives an input from the user. When an input from the user is made, the communication unit 215 transmits a notification including an input result to the cloud server 30.

Also, for example, if a notification indicating that the forward button 105 has been selected on the screen illustrated in FIG. 7 has been received, the camera view angle judge processor 305 controls the communication unit 301 to transmit a notification for causing the captured image check device 20b to display a screen illustrated in FIG. 8 to the captured image check device 20b.

If the notification for causing the captured image check device 20b to display the screen illustrated in FIG. 8 has been received from the cloud server 30, the display controller 210b of the captured image check device 20b causes the display 211 to display the screen illustrated in FIG. 8 and receives an input from the user. When an input from the user is made, the communication unit 215 transmits a notification including an input result to the cloud server 30.

Also, for example, if a notification indicating that the OK button 108 has been selected on the screen illustrated in FIG. 8 has been received, the camera view angle judge processor 305 controls the communication unit 301 to transmit a notification for causing the captured image check device 20b to display the screen illustrated in FIG. 9 to the captured image check device 20b.

If the notification for causing the captured image check device 20b to display the screen illustrated in FIG. 9 has been received from the cloud server 30, the display controller 210b of the captured image check device 20b causes the display 211 to display the screen illustrated in FIG. 9 and receives an input from the user. When an input from the user is made, the communication unit 215 transmits a notification including an input result to the cloud server 30.

In step S310, if a notification indicating that the crack analysis check button 102 has been selected has been received, the road surface state analysis judge processor 306 performs the crack detection judge process on the basis of the still-image data 341. Specifically, the road surface state analysis judge processor 306 controls the communication unit 301 to transmit a notification for causing the captured image check device 20b to display the screen illustrated in FIG. 10 to the captured image check device 20b.

If the notification for causing the captured image check device 20b to display the screen illustrated in FIG. 10 has been received from the cloud server 30, the display controller 210b of the captured image check device 20b causes the display 211 to display the screen illustrated in FIG. 10 and receives an input from the user. When an input from the user is made, the communication unit 215 transmits a notification including an input result to the cloud server 30.

If the notification that the OK button 109 has been selected on the screen illustrated in FIG. 10 has been received, the road surface state analysis judge processor 306 controls the communication unit 301 to transmit a notification for causing the captured image check device 20b to display a screen illustrated in FIG. 11 to the captured image check device 20b.

If the notification for causing the captured image check device 20b to display the screen illustrated in FIG. 11 has been received from the cloud server 30, the display controller 210b of the captured image check device 20b causes the display 211 to display the screen illustrated in FIG. 11 and receives an input from the user. When an input from the user is made, the communication unit 215 transmits a notification including an input result to the cloud server 30.

When the road surface state analysis judge processor 306 receives a notification indicating that the end button has been selected on the screen illustrated in FIG. 11, the road surface state analysis judge processor 306 ends the crack detection judge process. Thereafter, the camera view angle judge processor 305 and the road surface state analysis judge processor 306 store results of the judge processes as the judge results 343 in the storage 304.

Thereafter, when an instruction for requesting the results of the judge processes is input from the user, the operation unit 216 requests the cloud server 30 to provide judge results via the communication unit 215 in step S311.

In step S312, the communication unit 301 of the cloud server 30 transmits the judge results 343 stored in the storage 304 to the captured image check device 20b in response to the judge result request transmitted from the captured image check device 20b.

According to the captured image check system 100a configured as described above, it is possible to obtain an effect similar to that of the first embodiment.

Also, because the judge process is performed by the cloud server 30 in the captured image check system 100a, a processing load of the device provided in the vehicle 2 can be reduced. Also, because the results of the judge processes are stored in the cloud server 30, it is possible to ascertain the results of the judge processes from various places.

Furthermore, if a road administrator performs photographing using the camera 10 while patrolling a road, it is possible to easily ascertain a road surface crack management state by merely accessing the cloud server 30 and use the cloud server 30 also for daily management of the road surface.

Modified Example of Third Embodiment

Although a configuration in which the still-image converter 302 converts all processing target image data received by the communication unit 301 into still-image data has been described in the present embodiment, it is also possible to thin the processing target image data at predetermined intervals and convert processing target image data after thinning into still-image data.

According to the configuration as described above, it is possible to reduce a processing load because it is unnecessary to convert the entire moving image to still-image data even when the processing target image data is a long-time moving image.

Although the configuration in which image data of a moving image is obtained through photographing performed by the camera 10 has been described in the present embodiment, a configuration in which still-image data is obtained through photographing performed by the camera 10 may be adopted. In the case of such a configuration, the still-image converter 302 associates the still-image data with clock time information and position information to store them as the still-image data 341 in the storage 304 without performing a process of converting the processing target image data into the still-image data.

Although a configuration in which the user determines whether or not a condition is satisfied by viewing still-image data and post-analysis still-image data in the camera view angle judge process and the crack detection judge process has been described in the present embodiment, the cloud server 30 may be configured to perform the camera view angle judge process and the crack detection judge process through image processing to determine whether or not the first condition and the second condition are satisfied.

If the communication unit 215 is configured to directly acquire the processing target image data from the image data acquisitor 203, the captured image check device 20b may not execute the processing of step S304 in the process of FIG. 15. In the case of such a configuration, the captured image check device 20b associates the processing target image data acquired by the image data acquisitor 203 in the processing of step S303 with clock time information and transmits them to the cloud server 30 through the communication unit 215 in the processing of step S305.

Fourth Embodiment

A fourth embodiment is an embodiment in which a judge process using image data captured by a captured image check device equipped with a camera is performed by a server on a cloud.

Figure 16:
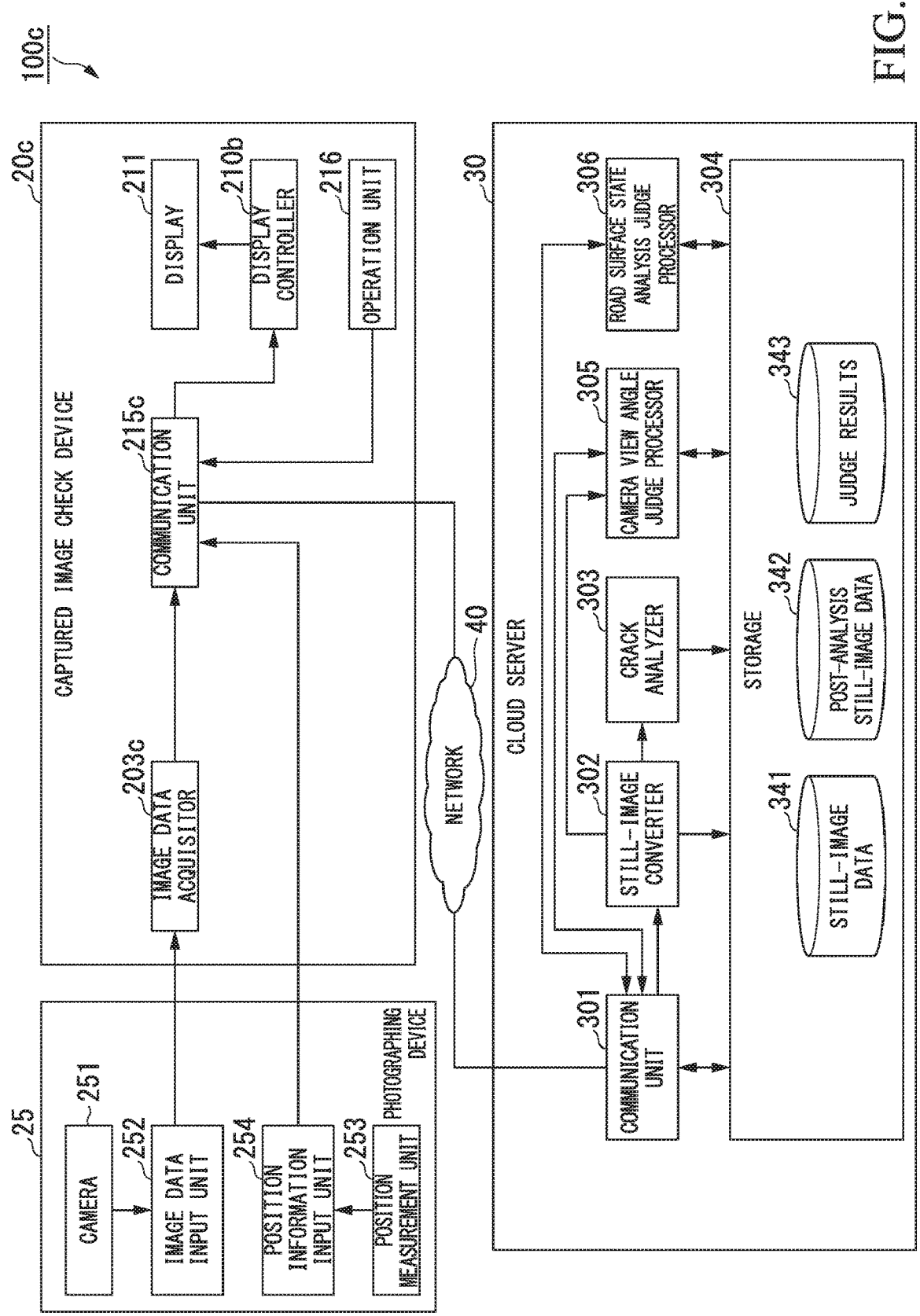
FIG. 16 is a diagram illustrating a system configuration of a captured image check system according to a fourth embodiment.

FIG. 16 is a diagram illustrating a system configuration of a captured image check system 100c according to the fourth embodiment.

The captured image check system 100c includes a captured image check device 20c, a photographing device 25, and a cloud server 30. The captured image check device 20c and the photographing device 25 are connected, for example, via a LAN. The captured image check device 20c and the cloud server 30 are connected via the network 40.

The photographing device 25 is a device including an internal camera 251 and configured to photograph a road surface by using the camera 251. The photographing device 25 outputs image data of the road surface obtained through photographing using the camera 251 to the captured image check device 20c. The captured image check device 20c is a device configured to transmit the image data output from the photographing device 25 to the cloud server 30 and acquire and display a result of a pre judge process for analyzing a road surface state from the cloud server 30 in response to a request of a user. The captured image check device 20c and the photographing device 25 are installed within the vehicle 2 that travels on a road on which a road surface is photographed.

The cloud server 30 is a device configured to input image data transmitted from the captured image check device 20c and perform a pre judge process for analyzing a road surface state on the basis of the input image data. The cloud server 30 is an external device provided in a place different from that of the road on which the road surface is photographed.

Specific configurations of the captured image check device 20c, the photographing device 25, and the cloud server 30 will be described below. Also, because the configuration of the photographing device 25 is similar to that of the second embodiment, description thereof will be omitted. Also, because the configuration of the cloud server 30 is similar to that of the third embodiment, description thereof will be omitted.

The captured image check device 20c includes a CPU, a memory, an auxiliary storage device, and the like connected by a bus, and executes a captured image check program. By the execution of the captured image check program, the captured image check device 20c functions as a device including a image data acquisitor 203c, a display controller 210b, a display 211, a communication unit 215c, and a operation unit 216. Also, all or some of functions of the captured image check device 20c may be implemented using hardware such as an ASIC, a PLD, or an FPGA. The captured image check program may be recorded on a computer-readable recording medium. Also, the computer-readable recording medium is a storage device such as a flexible disk, a magneto-optical disc, a ROM, a portable medium such as a CD-ROM, or a hard disk embedded in a computer system. The captured image check program may be transmitted and received via an electrical communication circuit.

A configuration of the captured image check device 20c is different from the configuration of the captured image check device 20b in that the captured image check device 20c includes the image data acquisitor 203c and the communication unit 215c in place of the image data acquisitor 203 and the communication unit 215 and does not include an image data input unit 201, the clock time information input unit 202, the GPS data retrieval unit 204, and the storage 207b. The captured image check device 20c is similar to the captured image check device 20b in terms of other configurations. Thus, description of the entire captured image check device 20c will be omitted and the image data acquisitor 203c and the communication unit 215c will be described.

The image data acquisitor 203c acquires image data input to the image data input unit 201c as processing target image data.

The communication unit 215c is a functional unit configured to communicate with the cloud server 30 via a network. The communication unit 215c associates processing target image data acquired by the image data acquisitor 203c with clock time information and position information input by the position information input unit 254 and transmits them to the cloud server 30.

Figure 17:
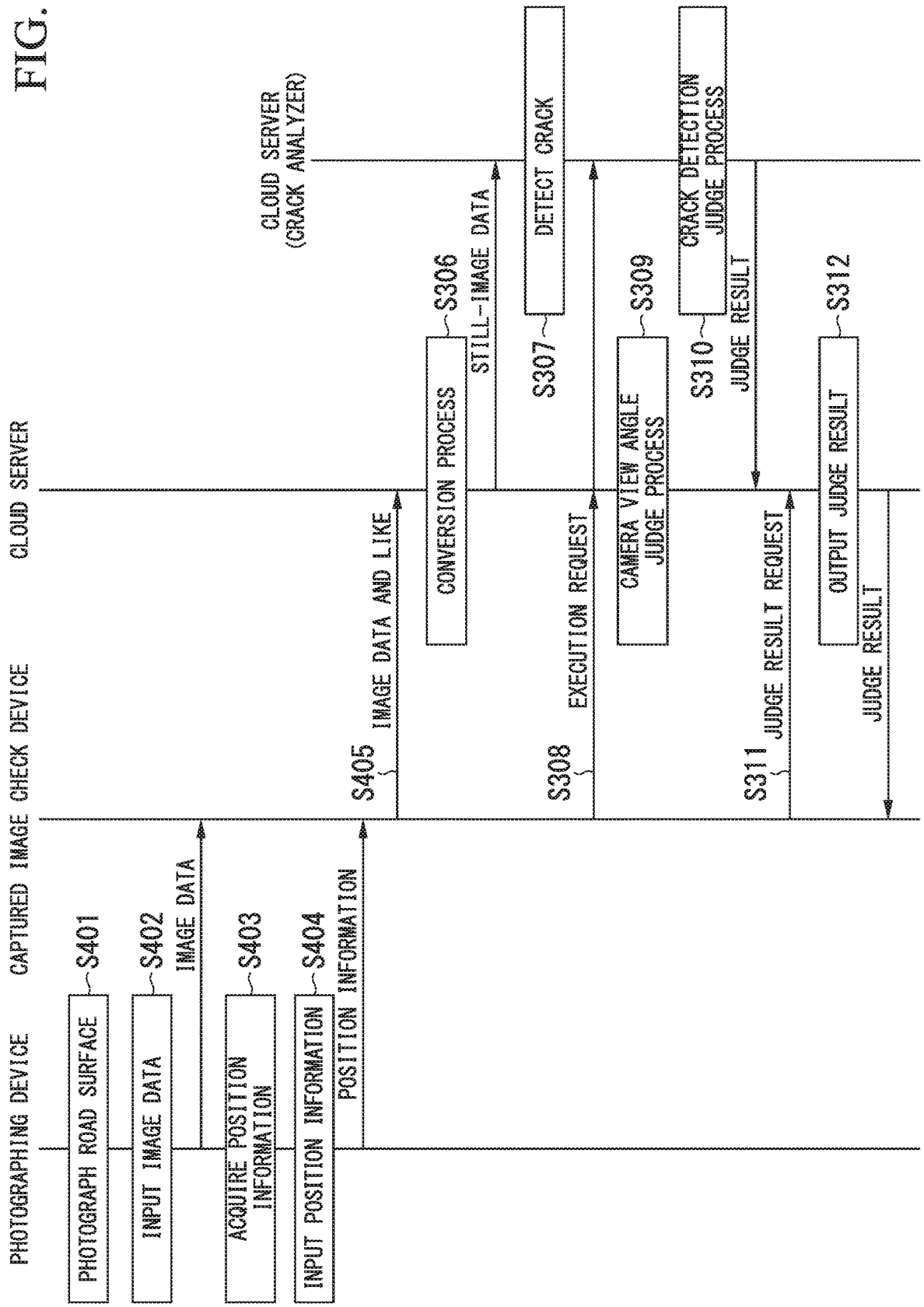
FIG. 17 is a sequence diagram illustrating a flow of a process of the captured image check system according to the fourth embodiment.

FIG. 17 is a sequence diagram illustrating a flow of a process of the captured image check system 100c according to the fourth embodiment. In FIG. 17, processing similar to that of FIG. 15 is denoted by a reference sign similar to that of FIG. 15 and description thereof will be omitted. Also, the camera view angle judge process and the crack detection judge process to be performed by the cloud server 30 illustrated in FIG. 17 may be executed by the same device or the judge processes may be executed by separate devices. In FIG. 15, a case in which the camera view angle judge process and the crack detection judge process are executed by the same device will be described as an example.

In step S401, the camera 251 of the photographing device 25 photographs the road surface according to an operation of a user. For example, the camera 251 photographs the road surface in a moving image according to an operation of the user. The camera 251 outputs image data of the road surface of the captured moving image to an image data input unit 252. Also, the image data of the road surface includes clock time information related to a clock time at which the road surface was photographed. In step S402, the image data input unit 252 inputs the image data of the moving image captured by the camera 251. The image data input unit 252 outputs the image data of the input moving image to the captured image check device 20c.

The image data acquisitor 203c of the captured image check device 20c acquires the image data input to the image data input unit 252 as processing target image data.

Next, in step S403, the position measurement unit 253 measures a position when the camera 251 performs photographing. The position measurement unit 253 outputs a position measurement result to the position information input unit 254.

Next, in step S404, the position information input unit 254 inputs information about the position measured by the position measurement unit 253. The position information input unit 254 outputs the input position information to the captured image check device 20c.

In step S405, the communication unit 215c of the captured image check device 20c associates the processing target image data acquired by the image data acquisitor 203c with the clock time information and the position information obtained by the position information input unit 254 and transmits them to the cloud server 30. Thereafter, a process of conversion into a still image in step S306 and a process subsequent thereto are executed.

According to the captured image check system 100c configured as described above, it is possible to obtain an effect similar to that of the second embodiment.

Also, because the judge process is performed by the cloud server 30 in the captured image check system 100c, a processing load of the device provided in the vehicle 2 can be reduced. Also, because the results of the judge processes are stored in the cloud server 30, it is possible to ascertain the results of the judge processes from various places.

Furthermore, if a road administrator brings the photographing device 25 having a built-in camera 251 that can be carried around while patrolling a road, it is possible to easily ascertain a road surface crack management state by merely accessing the cloud server 30 and use the cloud server 30 also for daily management of the road surface.

Modified Example of Fourth Embodiment

Although a configuration in which the still-image converter 302 converts all processing target image data received by the communication unit 301 into still-image data has been described in the present embodiment, it is also possible to thin the processing target image data at predetermined intervals and convert processing target image data after thinning into still-image data.

According to a configuration as described above, it is possible to reduce a processing load because it is unnecessary to convert the entire moving image to still-image data even when the processing target image data is a long-time moving image.

Although the configuration in which image data of a moving image is obtained through photographing performed by the camera 251 has been described in the present embodiment, a configuration in which still-image data is obtained through photographing performed by the camera 251 may be adopted. In the case of such a configuration, the still-image converter 302 associates the still-image data with clock time information and position information to store them as still-image data 341 in the storage 304 without converting the processing target image data into the still-image data.

The captured image check device 20c may be configured to acquire post-analysis still-image data 342 and position information from the cloud server 30 and display results (an analysis image and a degree of deterioration) on a map by using the acquired post-analysis still-image data 342 and position information.

Although a configuration in which a user determines whether or not a condition is satisfied by viewing still-image data and post-analysis still-image data in the camera view angle judge process and the crack detection judge process has been described in the present embodiment, the cloud server 30 may be configured to perform the camera view angle judge process and the crack detection judge process through image processing to determine whether or not the first condition and the second condition are satisfied.

The photographing device 25 and the captured image check device 20c may be configured to be integrated into a single device.

Modified Example Common to First to Fourth Embodiments

Although the configuration in which image data obtained through photographing performed by the camera 10 or the camera 251 is used for a judge process has been described in each embodiment described above, image data recorded on a portable recording medium such as a secure digital (SD) card or a universal serial bus (USB) memory may also be used for the judge process.

Although a road surface state analysis target and a crack have been described as an example in each embodiment described above, the road surface state analysis target may be an object provided on a road surface such as a guardrail, a manhole, a road sign, or a white line.

The result of the judge process may be output in association with post-analysis still-image data and position information.

The captured image check device 20, the photographed image preliminary checking device 20a, and the cloud server 30 in each of the above-described embodiments may be configured to determine a degree of deterioration (largeness: the entire road surface is cracked/medium: about half the road surface is cracked/smallness: substantially no crack) from the number of cracks of post-analysis still-image data.

Either judge process may be first executed in the execution order of the camera view angle judge process and the crack detection judge process.

According to at least one embodiment described above, a captured image check system includes a camera, an image data input unit, a camera view angle judge processor, a road surface state analysis judge processor, and an output unit. The camera photographs a road surface. The image data input unit inputs image data to be used for analyzing a state of the road surface photographed by the camera. The camera view angle judge processor performs a judge process of determining whether or not an angle of view of the camera satisfies a first condition for analyzing the state of the road surface on the basis of the image data input to the image data input unit. The road surface state analysis judge processor performs a judge process of determining whether or not a second condition for analyzing the state of the road surface is satisfied on the basis of image data of the road surface input to the image data input unit. The output unit outputs a result of the judge process of the camera view angle judge processor and a result of the judge process of the road surface state analysis judge processor. Thereby, it is possible to easily check a state in which a road surface is photographed.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A captured image check system, comprising:
a camera configured to photograph a road surface;
an image data input interface configured to input image data to be used for analyzing a state of the road surface photographed by the camera;
a camera view angle judge processor configured to perform a judge process of determining whether or not an angle of view of the camera satisfies a first condition for analyzing the state of the road surface on the basis of the image data input to the image data input interface;
a road surface state analysis judge processor configured to perform a judge process of determining whether or not a second condition for analyzing the state of the road surface is satisfied on the basis of image data of the road surface input to the image data input interface; and
an output interface configured to output a result of the judge process of the camera view angle judge processor and a result of the judge process of the road surface state analysis judge processor,
wherein the first condition is that the camera is facing a rear side or a front side,
wherein the camera view angle judge processor causes a frame indicating a range to be displayed on the image data and performs reception of an input indicating that the first condition is satisfied from a user or makes a judge of whether or not the first condition is satisfied through image processing as a process of determining whether or not the first condition is satisfied,
wherein the first condition further includes a condition that a traffic lane of the road surface that is a road surface state analysis target appears near a center of the image data,
wherein the camera view angle judge processor causes a grid-like frame divided into predetermined partitions to be displayed on the image data and performs reception of an input indicating that the first condition is satisfied from the user or makes a judge of whether or not the first condition is satisfied through image processing as the process of determining whether or not the first condition is satisfied,
wherein the first condition further includes a condition that a horizon appears in a predetermined range on the image data, and
wherein the camera view angle judge processor causes a frame indicating a range in which the horizon is to be photographed to be displayed on the image data and performs reception of an input indicating that the first condition is satisfied from the user or makes a judge of whether or not the first condition is satisfied through image processing as the process of determining whether or not the first condition is satisfied.

2. The captured image check system according to claim 1, wherein the first condition further includes a condition that a body of a vehicle equipped with the camera that is photographing the road surface does not appear in the image data, and wherein the camera view angle judge processor causes the image data to be displayed and performs reception of an input indicating that the first condition is satisfied from the user or makes a judge of whether or not the first condition is satisfied through image processing as the process of determining whether or not the first condition is satisfied.

3. The captured image check system according to claim 1, wherein the second condition is that a crack of the road surface is detected, wherein the captured image check system further comprises a crack analyzer configured to detect a crack of the road surface from the image data and generate post-analysis image data by superimposing the detected crack on the image data, and wherein the road surface state analysis judge processor causes the post-analysis image data generated by the crack analyzer to be displayed and performs reception of an input indicating that the second condition is satisfied from a user or makes a judge of whether or not the second condition is satisfied in accordance with whether or not the crack is able to be detected in the post-analysis image data as the judge process of determining whether or not the second condition is satisfied.

4. The captured image check system according to claim 1, comprising:

a captured image check device provided within a vehicle that travels on a road on which a road surface is photographed; and an external device provided in a place different from that of the road on which a road surface is photographed, wherein the captured image check device includes the image data input interface and a communication unit configured to transmit the image data obtained through photographing by the camera to the external device, and wherein the external device includes the camera view angle judge processor, the road surface state analysis judge processor, and the output interface.

5. The captured image check system according to claim 1, comprising:

a captured image check device provided within a vehicle that travels on a road on which a road surface is photographed; and an external device provided in a place different from that of the road on which a road surface is photographed, wherein the captured image check device includes the camera, the image data input interface, and a communication unit configured to transmit the image data obtained through photographing by the camera to the external device, and wherein the external device includes the camera view angle judge processor, the road surface state analysis judge processor, and the output interface.

6. The captured image check system according to claim 1, further comprising:

a still-image converter configured to thin a moving image at a predetermined interval if the image data is a moving image and convert the moving image after thinning into image data of a still image.

7. A captured image check method, comprising:

inputting image data to be used for analyzing a state of a road surface photographed by a camera configured to photograph the road surface;

performing a first judge process of determining whether or not an angle of view of the camera satisfies a first condition for analyzing the state of the road surface on the basis of the image data input;

performing a second judge process of determining whether or not a second condition for analyzing the state of the road surface is satisfied on the basis of image data of the road surface input; and outputting a result of the first judge process and a result of the second judge, wherein the first condition is that the camera is facing a rear side or a front side, wherein the captured image check method further comprising causing a frame indicating a range to be displayed on the image data and performing reception of an input indicating that the first condition is satisfied from a user or making a judge of whether or not the first condition is satisfied through image processing as a process of determining whether or not the first condition is satisfied, wherein the first condition further includes a condition that a traffic lane of the road surface that is a road surface state analysis target appears near a center of the image data, wherein the captured image check method further comprising causing a grid-like frame divided into predetermined partitions to be displayed on the image data and performing reception of an input indicating that the first condition is satisfied from the user or making a judge of whether or not the first condition is satisfied through image processing as the process of determining whether or not the first condition is satisfied, wherein the first condition further includes a condition that a horizon appears in a predetermined range on the image data, and wherein the captured image check method further comprising—causing a frame indicating a range in which the horizon is to be photographed to be displayed on the image data and performing reception of an input indicating that the first condition is satisfied from the user or making a judge of whether or not the first condition is satisfied through image processing as the process of determining whether or not the first condition is satisfied.

8. The captured image check method according to claim 7, wherein the first condition further includes a condition that a body of a vehicle equipped with the camera that is photographing the road surface does not appear in the image data, and wherein the captured image check method further comprising causing the image data to be displayed and performing reception of an input indicating that the first condition is satisfied from the user or making a judge of whether or not the first condition is satisfied through image processing as the process of determining whether or not the first condition is satisfied.

9. The captured image check method according to claim 7, wherein the second condition is that a crack of the road surface is detected, wherein the captured image check method further comprising detecting a crack of the road surface from the image data and generating post-analysis image data by superimposing the detected crack on the image data, and wherein the captured image check method further comprising causing the post-analysis image data generated to be displayed and performing reception of an input indicating that the second condition is satisfied from a user or making a judge of whether or not the second condition is satisfied in accordance with whether or not the crack is able to be detected in the post-analysis image data as the judge process of determining whether or not the second condition is satisfied.

10. The captured image check method according to claim 7, wherein the captured image check method is performed by a captured image check system including a captured image check device provided within a vehicle that travels on a road on which a road surface is photographed and an external device provided in a place different from that of the road on which a road surface is photographed, wherein the inputting image data by the captured image check device, wherein the transmitting the image data obtained through photographing by the camera to the external device by the captured image check device, wherein the performing a first judge process by the external device, wherein the performing a second judge process by the external device, and wherein the outputting a result of the first judge process and a result of the second judge process by the external device.

11. The captured image check method according to claim 7, further comprising:

thinning a moving image at a predetermined interval if the image data is a moving image and converting the moving image after thinning into image data of a still image.

* * * * *